US008150985B2

(12) United States Patent  
Nakamura

(10) Patent No.: US 8,150,985 B2  
(45) Date of Patent: Apr. 3, 2012

(54) APPLICATION EXECUTION MANAGING METHOD, APPLICATION EXECUTION SERVER COMPUTER, AND REPEATER

(75) Inventor: Tomohiro Nakamura, Hachioji (JP)

(73) Assignee: Hitachi, Ltd, Tokyo (JP)

( * ) Notice: Subject to any disclaimer, the term of this patent is extended or adjusted under 35 U.S.C. 154(b) by 146 days.

(21) Appl. No.: 12/367,021

(22) Filed: Feb. 6, 2009

(65) Prior Publication Data

US 2010/0063998 A1 Mar. 11, 2010

(30) Foreign Application Priority Data

Sep. 11, 2008 (JP) .................................. 2008-232805

(51) Int. Cl.  
*G06F 15/16* (2006.01)

(52) U.S. Cl. ........................................ 709/229

(58) Field of Classification Search .................. 709/229  
See application file for complete search history.

(56) References Cited

U.S. PATENT DOCUMENTS

| 7,216,149 | B1 | 5/2007 | Briscoe et al. | |
|---|---|---|---|---|
| 7,761,581 | B2 * | 7/2010 | Pagan .......................... | 709/228 |
| 7,765,275 | B2 * | 7/2010 | Crick et al. ..................... | 709/217 |
| 7,870,596 | B2 * | 1/2011 | Schackow et al. ............... | 726/1 |
| 2007/0005779 | A1 * | 1/2007 | Yao et al. ....................... | 709/228 |
| 2007/0245088 | A1 * | 10/2007 | Mogi et al. ..................... | 711/120 |
| 2008/0222270 | A1 * | 9/2008 | Gilbert .......................... | 709/217 |
| 2009/0144546 | A1 * | 6/2009 | Jancula et al. ................. | 713/168 |
| 2009/0193129 | A1 * | 7/2009 | Agarwal et al. ............... | 709/229 |
| 2010/0063998 | A1 * | 3/2010 | Nakamura ..................... | 709/203 |
| 2010/0262646 | A1 * | 10/2010 | Lee et al. ....................... | 709/203 |

FOREIGN PATENT DOCUMENTS

| JP | 2003-085082 | 3/2003 |
|---|---|---|
| JP | 2004-507816 | 3/2004 |

OTHER PUBLICATIONS

U.S. Appl. No. 12/028,272, filed Feb. 2008, T. Nakamura.

* cited by examiner

*Primary Examiner* — Jerry Dennison  
(74) *Attorney, Agent, or Firm* — Mattingly & Malur, PC

(57) ABSTRACT

A cache hit determining method in a server client system, such as a web system, which can determine whether a response received by a client is a response generated by a server or a response returned from a cache in the server client system. In the cache hit determining method, when the server generates the response, the serve adds a program for a cache hit determination and data to the response and the client executes the program included in the response, thereby realizing a cache hit determination.

13 Claims, 17 Drawing Sheets

| NO. | URL | THE NUMBER OF TIMES OF ACCESS | CACHE HIT RATIO IN CLIENT | CACHE HIT RATIO ON COMMUNICATION PATH |
|---|---|---|---|---|
| 1 | http://www/a/page.html | 100 | 90% | 5% |
| 2 | http://www/b/page.html | 80 | 90% | 5% |
| 3 | http://www/c/page.html | 60 | 80% | 10% |
| 4 | http://www/d/page.html | 50 | 80% | 10% |
| 5 | http://www/e/page.html | 40 | 80% | 10% |
| 6 | http://www/f/page.html | 30 | 70% | 15% |
| 7 | http://www/g/page.html | 20 | 80% | 10% |
| 8 | http://www/h/page.html | 10 | 50% | 20% |

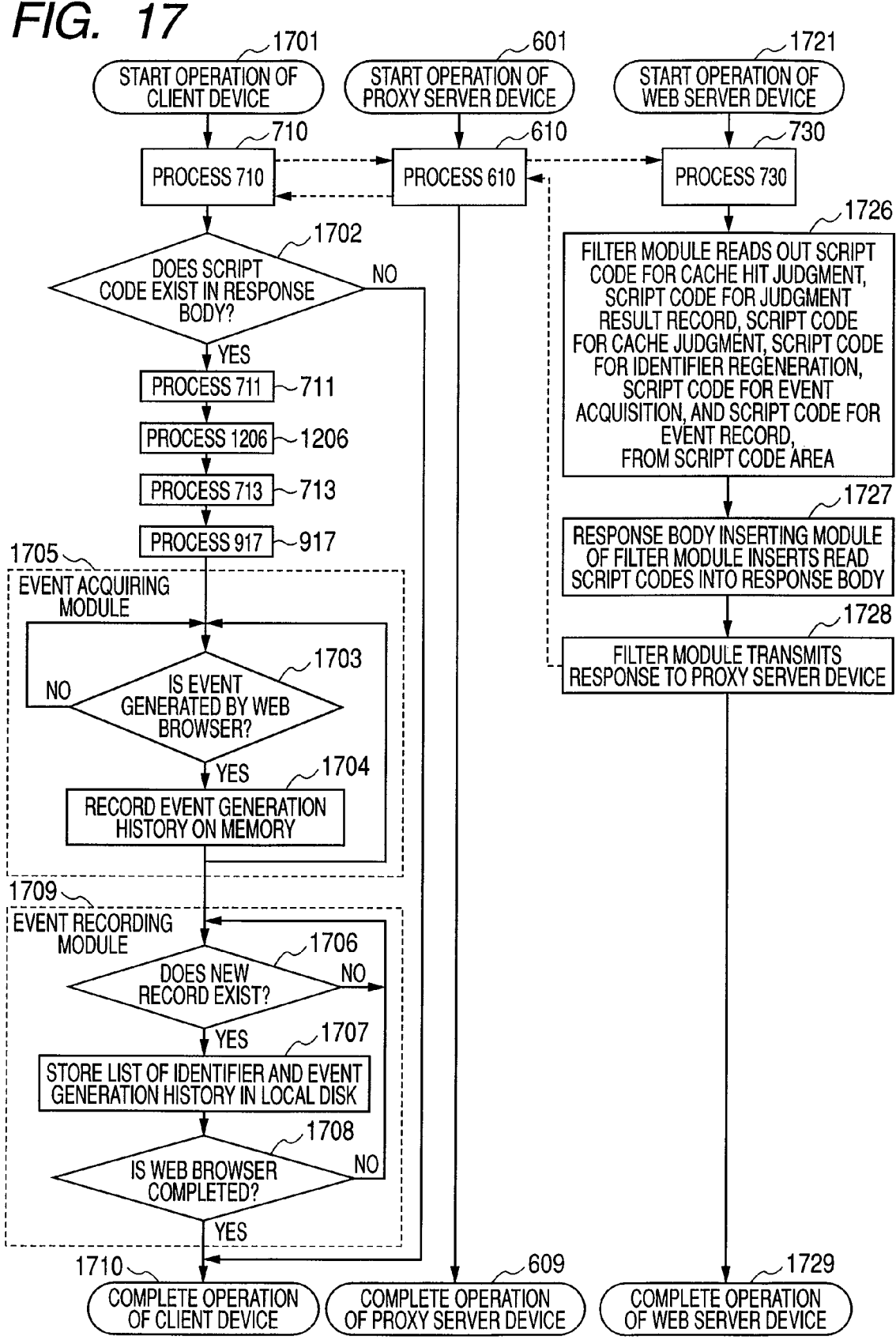

APPLICATION EXECUTION MANAGING METHOD, APPLICATION EXECUTION SERVER COMPUTER, AND REPEATER

CLAIM OF PRIORITY

The present application claims priority from Japanese patent application JP 2008-232805 filed on Sep. 11, 2008, the content of which is hereby incorporated by reference into this application.

FIELD OF THE INVENTION

The present invention relates to a system that manages an execution status of an application in a computer system. In particular, the present invention relates to a system that manages a response generation source in the system with a cache between a computer making a request to an application and another computer executing the application.

BACKGROUND OF THE INVENTION

Web applications have been used in various fields including business applications. Further, with the technical progress of business applications with rich client technology using script codes, there remains a need for the convenience of simple execution of web applications when a web browser is installed in a client device. According to the utilization of the web applications, it is required that the web applications achieve high availability, fast response speed, and usability. In particular, since the performance of a web application is affected by the response speed, research has been conducted to improve the response speed.

One field of research is directed to a method that has been widely used and has a superior effect, a high speeding method using a cache is exemplified. A cache in a web system that is an execution basis of a web application is a mechanism that temporarily stores a web page loaded by a web browser on a network such as a web server or a proxy server. With respect to a request to a web page, the cache returns the response instead of a web server generating a response and returning the response. The cache is generally provided between a client device and a server device. When the response is returned from the cache, communication time and time for generating the response can be shortened and the response speed can be improved.

A method of determining whether a cache can be used is different according to a type of a web application or a web page. However, in order to determine whether the cache can be used, it is needed to detect whether the cache hit is made for every access to a web page. As a method of detecting a cache hit, a method of determining the case where a time stamp of a web page is inquired to the server device and the corresponding time stamp is compared with a time stamp of the read web page and updated as a cache hit (refer to JP-A-Hei15 (2003)-85082), and a method in which image data where a cache is not hit is inserted into a web page and a server device determines when access is given to only the image data on the basis of an access history to the web page and the image data as cache hit (refer to JP-T-2004-507816) are known.

SUMMARY OF THE INVENTION

In recent years, a rich web page has increased in which a web page is updated using Java Script or an asynchronous communication technology without changing the web page or display contents according to an operation. In this rich web page, a unique identifier (ID) is applied to each access to the web page, thereby realizing an accurate operation of an application that dynamically changes or consistently recording an accurate operation or operation history.

However, when a web page is stored (cache hit) in a cache in a web system, these operations may not be accurately performed. For this reason, improvements to the response speed using the cache cannot be achieved because the cache is invalid or a request is output such that a response is obtained from the server device for every access.

Accordingly, it has been required to improve response speed by determining whether the cache can be used and using the cache maximally. The method of determining whether the cache can be used is different according to a type of a web application or a web page. However, in order to determine whether the cache can be used, it is needed to detect whether a cache hit is made for every access to a web page. For example, when a record of an operation performed on a web page is performed for every access to the web page, it is required to recognize another access to the same web page, give a unique ID for every access, and record the unique ID. However, in the above method, in the case of a cache hit, a unique ID is not obtained.

In order to achieve the above-described object, according to an aspect of the present invention, there is provided an application execution status managing method that manages an execution status of an application provided in a computer system that includes a first computer and a second computer. The application execution status managing method includes allowing the first computer to receive a request for the application from the second computer; allowing the first computer to insert a unique identifier and a program code, which allows the second computer to execute a first inspection to determine whether a cookie that uses the unique identifier as a name of a cookie exists and delete the cookie after the first inspection, into a web page that is included in a response corresponding to the request; allowing the first computer to insert a instruction, which sets the cookie that uses the unique identifier as the cookie name to the second computer, into a header of the response; and allowing the first computer to return the web page and the response including the header to the second computer.

According to an aspect of the present invention, a second computer can determine whether a corresponding response is a response from a first execution result or a response from a cache.

BRIEF DESCRIPTION OF THE DRAWINGS

FIG. 17 is a diagram illustrating a process flow of a client device, a proxy server device, and a web server device according to a seventh modification.

DETAILED DESCRIPTION OF THE PREFERRED EMBODIMENTS

First Embodiment

A cache hit determining method of a web application according to this embodiment will be described in detail with reference to FIGS. 1 to 7.

Figure 1:
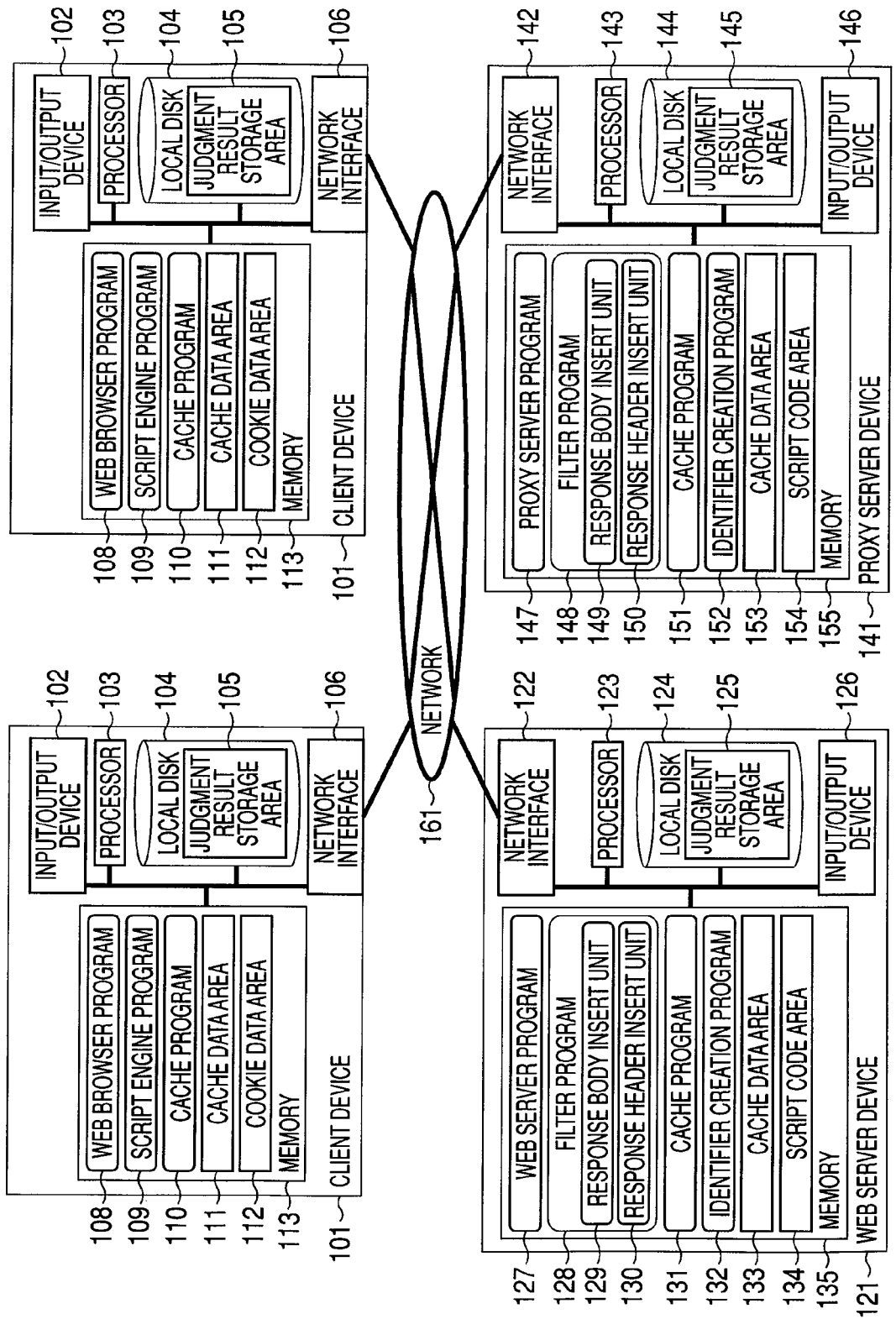
FIG. 1 is a diagram illustrating the configuration of a system that executes a web application.

FIG. 1 is a system configuration diagram illustrating an example of the hardware configuration and the software configuration of a system that executes a web application according to this embodiment.

The hardware configuration includes a client device 101, a web server device 121, a proxy server device 151, and a network 161 that is used to connect the above devices. The client device 101, the web server device 121, and the proxy server device 151 have processors 103, 123, and 143, memories 113, 135, and 155, input/output devices 102, 122, and 142, and local disks 104, 124, and 144, and network interfaces 106, 126, and 146, respectively, and are connected to each other.

The input/output device 102 is, for example, a keyboard, a mouse, or a monitor. The input device instructs to execute or stop a program, and the output device is a monitor that displays a program execution result. The processor 103 reads out a program from the memory 113 and executes a process. The local disk 104 receives a program execution result from the processor 103 and stores the program execution result, or stores data received from the outside through the network interface 106. The local disk 104 is provided with a judgment result storage area 105. A result that is obtained by reading out and executing a script engine program 109 by the processor 103 is stored in the judgment result storage area 105. The network interface 106 sends and receives data with an external device of the client device 101 through the network 161.

The memory 113 of the client device 101 stores a web browser program 108, the script engine program 109, and a cache program 110. The processor 103 executes these programs. Partial areas of the memory 113 are allocated to a cache data area 111 and a cookie data area 112. Further, the client device 101 may include the cache data area 111 or the cookie data area 112 in an area separated from the memory 113.

The web browser program 108 is a program that is used to request to transmit a web page or receive a response of the requested web page, analyze the response, and generate a display screen. The script engine program 109 is a program that is used to analyze a script code included in the response of the requested web page and allow the processor 103 to execute a process written in the script code. The cache program 110 is a program that is used to store the response of the web page that the client device 101 has received from the network 161 in the cache data area 111, determine whether the response of the web page that the web browser program 108 has requested exists in the cache data area 111, and read out the response from the cache data area 111 and deliver the response to the web browser program when the response exists in the cache data area. The cookie data area 112 is an area where data called cookie data is stored. The cookie data is received from the web browser program 108 or the script engine program 109 or stored, or is read out from the cookie data area and delivered to the web browser program 108 or the script engine program 109.

The memory 135 of the web server device 121 stores a web server program 127, a filter program 128, a cache program 131, and an identifier creation program 132. The filter program 128 includes a response body insert unit 129 and a response header inserting unit 130. Further, partial areas of the memory 135 are allocated to a cache data area 133 and a script code area 134. The processor 123 loads and executes these programs.

The web server program 127 is a program that is used to generate a response of a web page according to a request and return the response. The filter program 128 is a program that is used to add or modify contents with respect to a request of a web page or a response. Among the filter program 128, the response body insert unit 129 inserts a program code or data into a body portion of a response that includes a body and a header. Among the filter program 128, the response header inserting unit 130 inserts a program code or data into a header portion of a response.

The cache program 131 is a program that is used to store the response of the web page generated by the web server program 127 in the cache data area 133 or determine whether the response of the requested web page exists in the cache data area 133, and read the response from the cache data area 133 and return the response when the response exists in the cache data area.

The identifier creation program 132 is a program that is used to receive an identifier generation request and generate a unique value. Examples of a method of generating a unique value may include a method that reads out the unique value from a program counter that performs a count-up operation for every operation clock of the processor 123 and uses the unique value, a method that uses a system time, and a method that uses a combination of the above methods and an MAC address of a network interface, but the present invention is not limited thereto. Further, the MAC address is a unique value of the network interface. For example, the identifier generation request is requested from the web server program 127 when the web server device 121 receives the request, and the web server program 127 is executed by the processor 123 and a response is generated, or received from the outside. The script code area 134 is an area where a program called a script code is stored. The script code is inserted into the response by the filter program 128.

The input/output device 126, the processor 123, the local disk 124, and the network interface 126 execute the same functions as the devices having the same names in the client device 101. The data that is transmitted from the outside through the network interface 122 is stored in the judgment result storage area 125 that is provided in the local disk 124.

The memory 155 of the proxy server device 141 stores a proxy server program 147, a filter program 148, a cache program 151, and an identifier creation program 152. The filter program 148 includes a response body insert unit 149 and a response header inserting unit 150. Further, partial areas of the memory 155 are allocated to a cache data area 153 and a script code area 154. These programs are read and executed by the processor 143.

The proxy server program 147 is a program that is used to transmit the request from the client device 101 to the web server device 121 and transmit the response from the web server device 121 to the client device 101. The filter program 148, the response body insert unit 149, and the response header inserting unit 150 execute the same processes as the programs that have the same names in the server device 121.

The cache program 151 is a program that is used to store the response of the web page that the proxy server device 141 has received from the network 161 in the cache data area 153 or inspect whether the response of the web page, which is requested by the request received from the outside of the proxy server device 141 through the network interface 142 exists in the cache data area 153, and read out the response from the cache data area 153 and return the response, when the response exists in the cache data area.

The identifier creation program 152 is a program that is used to receive an identifier generation request and generate a unique value. The script code area 154 is an area where a program called a script code is stored, and the script code is inserted into the response by the filter program 148.

The input/output device 146, the processor 143, the local disk 144, and the network interface 142 execute the same functions as the devices having the same names in the server device 121. Also, a judgment result storage area 145 that is provided in the local disk 144 has the same structure as the judgment result storage area 125 in the server device 121.

Figure 2:
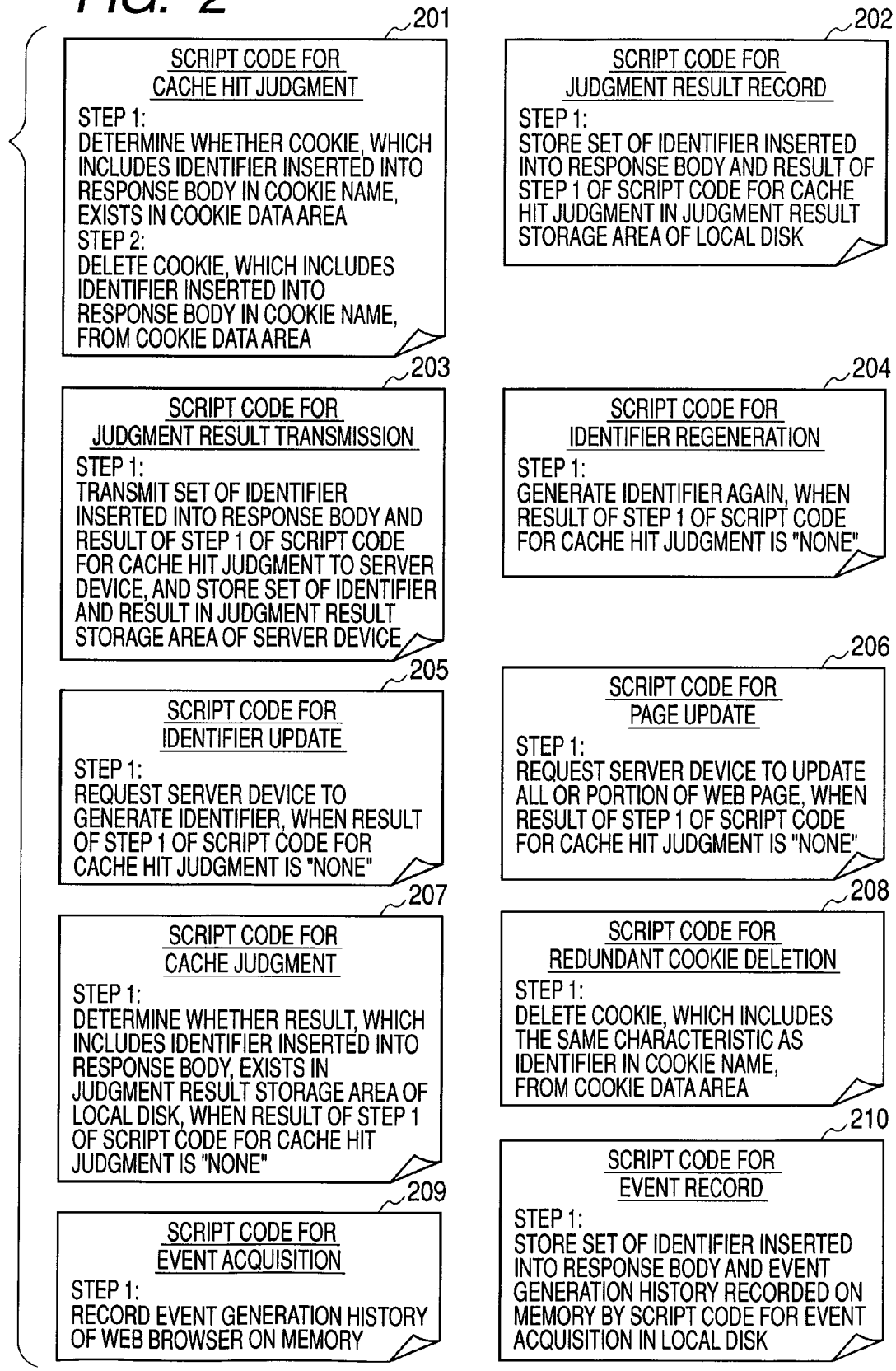
FIG. 2 is a diagram illustrating an example of script codes that are inserted into a response in a server device.

FIG. 2 shows an example of script codes (programs) that are stored in script code areas 134 and 154 that are provided in a server device 121 and a proxy server device 141, respectively. These script codes 201 to 210 are inserted into the response by the filter programs 128 and 148 that are executed by the processors 123 and 143 of the web server device 135 and the proxy server device 141. Then, the response is transmitted to the client device 101, and the script engine program 109 that is executed by the processor 103 interprets the script codes and executes corresponding processes.

Among the script codes 201 to 210 that are shown in FIG. 2, the script codes that are used in the first embodiment are two, that is, the script code 201 for a cache hit determination and the script code 202 for a determination result record. The other script codes 203 to 210 are used in modifications, and the script codes may not be stored in the script code areas 134 and 154 in the this embodiment.

A web application process flow according to this embodiment will be described with reference to FIGS. 3 and 4.

Figure 4:
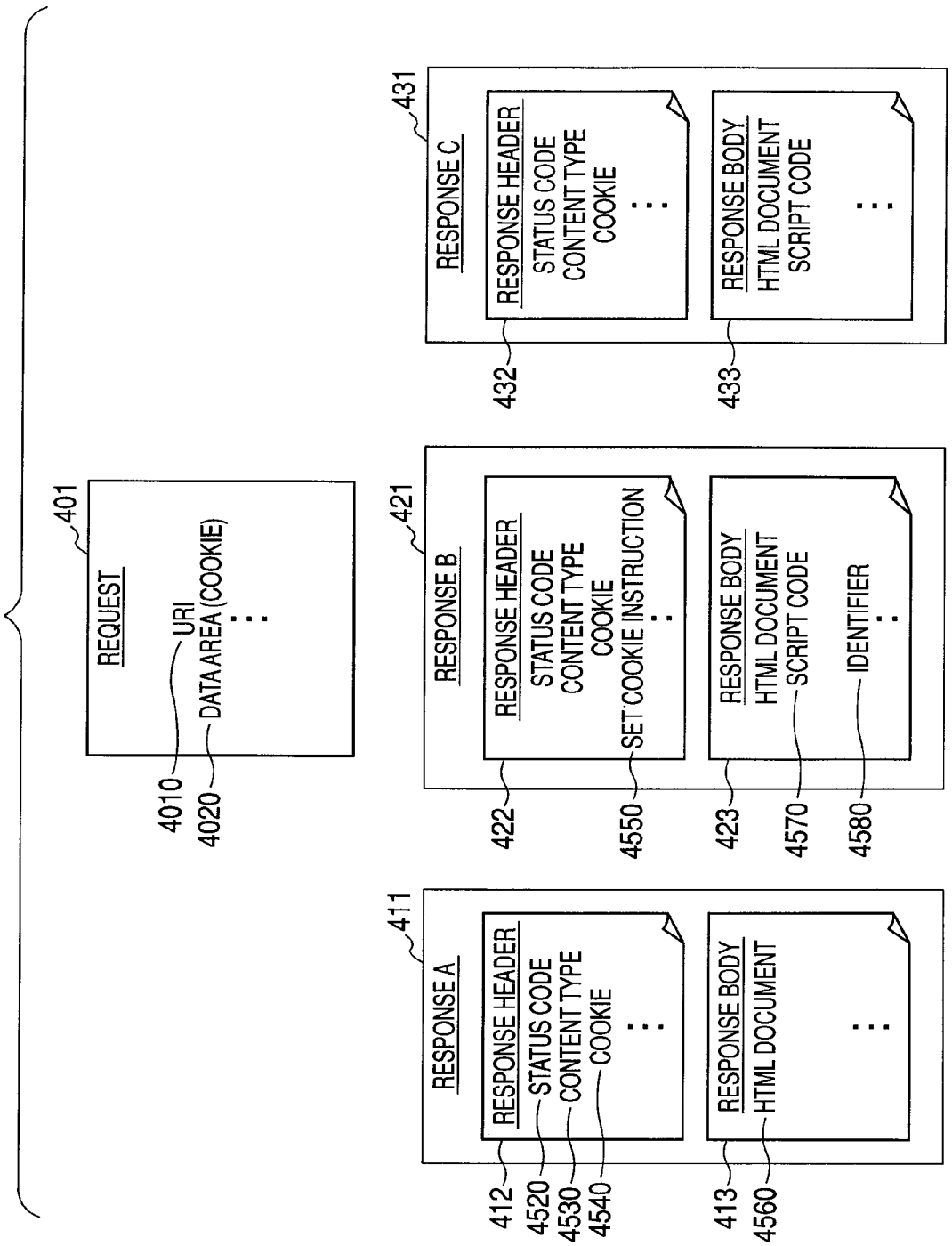
FIG. 4 is a diagram illustrating the configuration of a request and a response in a web system.

FIG. 4 is a diagram illustrating the configuration of a request and a response in a web system according to this embodiment. As shown in FIG. 4, a request 401 includes at least a uniform resource identifier (URI) 4010 that defines a place where a web page exists, and a data area (cookie) 4020 that can be set by the client device 101. As the response, a response A 411 to a response C 431 that have different formats are exemplified, as shown in FIG. 4.

The responses have response headers 412, 422, and 432 and response bodies 413, 423, and 433, respectively. The response A 411 to the response C 431 are different from each other in contents that are included in the response headers and the response bodies. The contents that are included in each response header include a status code 4520 that indicates a response status, a content type 4530 that indicates a type of contents included in the response body, a cookie 4540 that can be used to exchange data between the client device 101 and the web server device 121, and a set cookie instruction 4550 that sets a cookie to the client device. Meanwhile, the contents that are included in each response body include an HTML document 4560 that is analyzed by the web browser module 308 of the client device 101 and generates a display screen, and a script code 4570 that is analyzed by the script engine module 309 and allows a corresponding process to be executed. Further, the contents that are included in each response body may further include an identifier 4580 that is generated by executing the identifier creation program and used to uniquely specify a web page. An example of the script code 4570 is the script code that is shown in FIG. 2. The HTML document may include image data.

Figure 3:
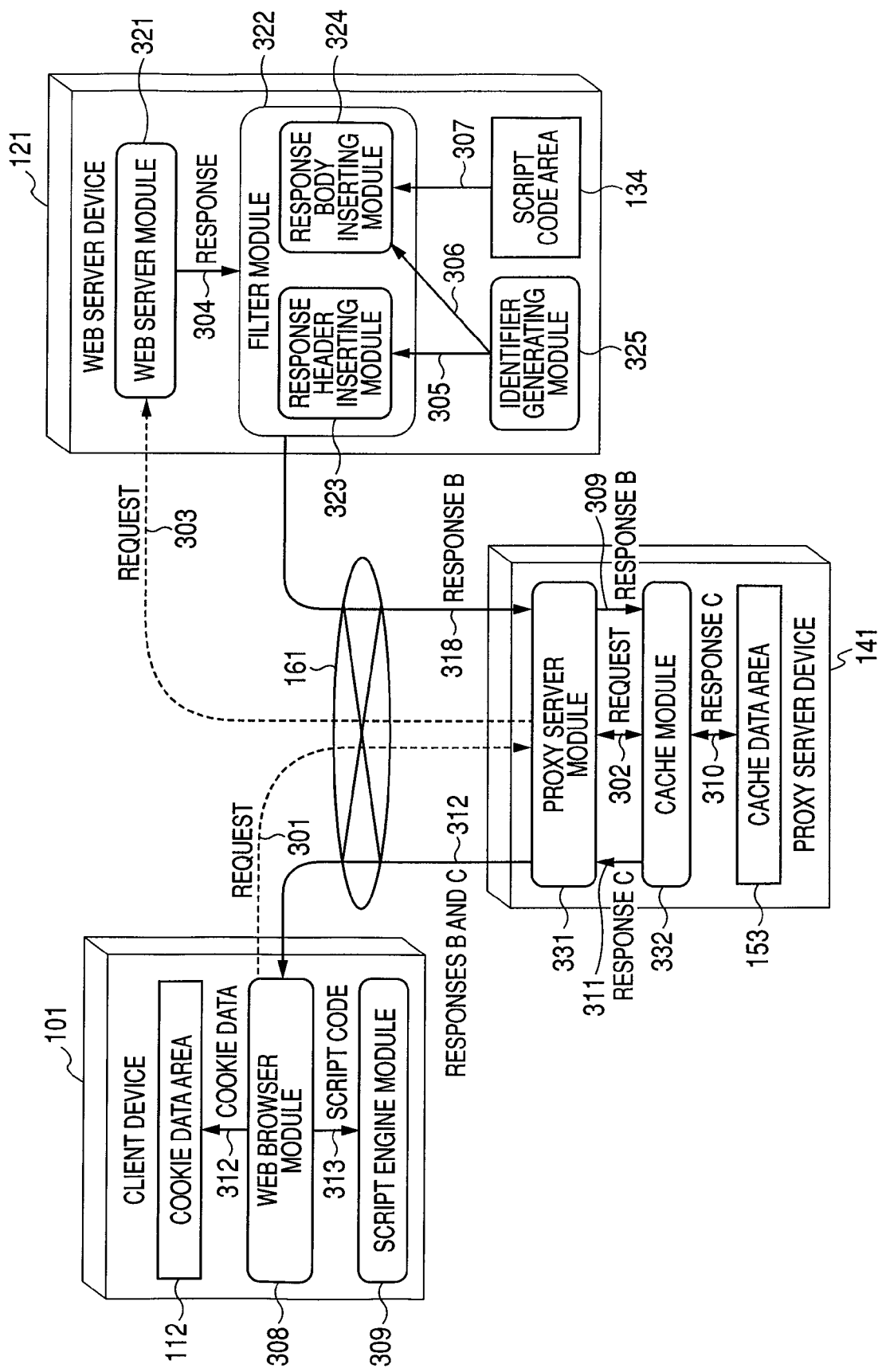
FIG. 3 is a diagram illustrating an example of a process flow of a web application.

FIG. 3 shows an example of a process flow of a web application. In a system where the client device 101, the web server device 121, and the proxy server device 141 are connected through the network 161, a series of processes until a request of a web page is transmitted from the client device 101, the web server device 121 generates a response of the requested web page and returns the response, the web page is displayed by the client device 101, and the script codes are executed are sequentially described. Further, in the drawings after FIG. 3, a state where a program is executed on a processor is called a module. For example, when a web browser program is executed on a processor, this is called a web browser module. The response that is generated by the web server module 321 may be any one of the response A 411, the response B 421, and the response C 431. First, the web browser module 308 of the client device 101 transmits a request 301 of a web page to the proxy server device 141 through the network 161 (301). In the proxy server device 141, the proxy server module 331 receives the request and the cache module 332 inspects whether a response corresponding to the request exists in the cache data area 154 (302).

When the response does not exist in the cache data area 154, the proxy server module 331 transmits the request to the web server device 121 (303). In the web server device 121, the web server module 321 interprets the request and generates a response.

The filter module 322 inserts an identifier and a script code into the response header and the response body, with respect to the response (304) that is received from the web server module 321. The identifier is a unique value that is generated by the identifier generating module 325, when the web server module 321 generates the response. The response header inserting module 323 inserts a set cookie name to set the identifier as a cookie name into the response header. The cookie and the set cookie instruction will be described in detail below with reference to FIG. 5.

The response body inserting module 324 that is included in the filter module 322 inserts the identifier generated by the identifier generating module 325 and the script code read out from the script code area 134 into the response body. As a result, the response becomes the response B 432 that is shown in FIG. 4. The response header of the response B 432 includes a cookie and a set cookie instruction. The response B 432 is transmitted to the proxy server device 141.

The proxy server device 141 receives a response from the web server device 121 by the proxy server module 331, and transmits the response to the client device 101. At this time, the cache module 332 stores the response in the cache data area 154. When the cache module 332 stores the response in the cache data area 154, the cache module 332 stores the response after deleting a set cookie instruction included in the response header of the response B 421, because of a security problem. Accordingly, the response that is stored in the cache data area 154 becomes the response C 431 that is shown in FIG. 4. The response header of the response C 432 includes a cookie but does not include the set cookie instruction that is included in the response B 421.

Next, the case where the response C exists in the cache data area 154 will be described. In this case, the cache module 332 reads out the response C from the cache data area 154 and transmits the response C from the proxy server device 141 to the client device 101. The proxy server module 331 does not transmit the request to the web server device 121. In general, as compared with the case where the response is generated by the web server device 121, if the response is read out from the cache data area 154 of the proxy server device 141, it is possible to quickly return the response to the client device 101.

Although not shown in FIG. 3, in the flow of the process of generating the response of the web page, the cache program 131 and the cache data area 133 of the web server device 121 also realize the same functions as the functions that are realized by the cache module 332 and the cache data area 154 of the proxy server device 141, in the web server device. That is, the web server device 121 receives a request, reads out the response from the cache module, and returns the response to the proxy server device 141. In this case, the response of the web page may not be generated by the web server module 321.

Further, although not shown in FIG. 3, in the flow of the process of transmitting the response of the web page to the client device 101, the filter program 148, the identifier creation program 152, and the script code area 154 of the proxy server device 141 may realize the same functions as the functions that are realized by the filter module 322, the identifier generating module 325, and the script code area 134 of the web server device 121, in the proxy server device. That is, the filter program 148, the identifier creation program 152, and the script code area 154 may receive the response from the web server device 121, and insert the identifier or the script code into the header and the body of the response or insert the set cookie instruction therein.

Figure 5:
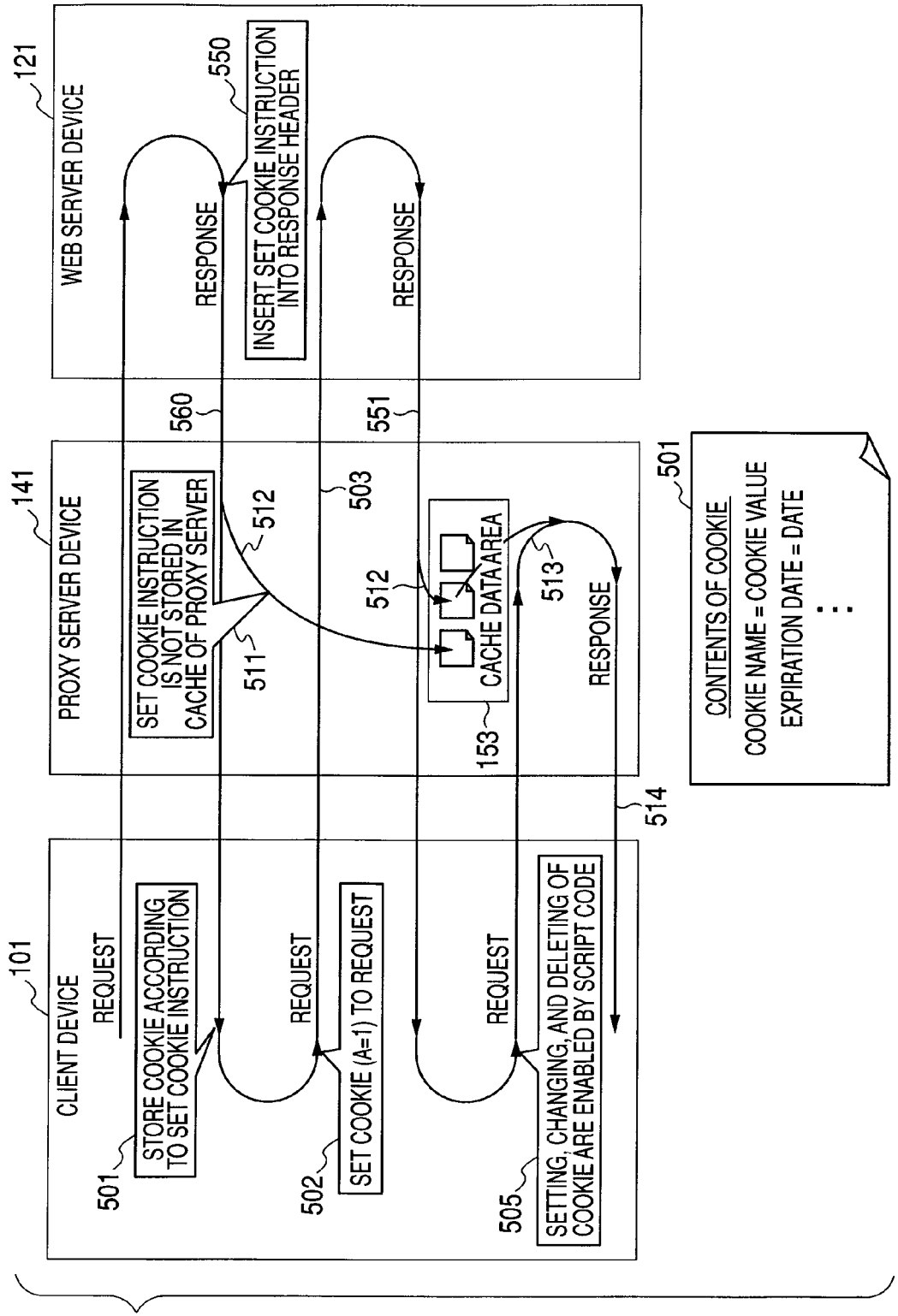
FIG. 5 is a diagram illustrating the operation of a cookie and a set cookie instruction in a web system.

FIG. 5 is a diagram illustrating the operation of a cookie and a set cookie instruction in a web system. A cookie 501 shows contents of the cookie. The contents 501 of the cookie include a name of the cookie, a value of the cookie, and a date of an expiration date.

The cookie that is composed of the contents 501 of the cookie is used when data is exchanged between the client device 101 and the web server device 121, as shown in FIG. 5. For example, when the web server device 121 desires to store data of A=1 with respect to the client device 101, the web server device 121 inserts into the response header a set cookie instruction that sets the cookie name as A and the cookie value as 1 (550), and transmits the response to the client device 101 through the proxy server device (560). If the client device 101 receives the response, first, the client device 101 executes the set cookie instruction that is inserted into the response header, and stores the contents of the cookie in the cookie data area 112 of the client device 101 according to contents that are described in the set cookie instruction (501). When the corresponding contents are the contents 501 of the cookie shown in FIG. 5, A=1 is stored in the cookie data area 112.

When the client device 101 transmits another request to the same web server device 121, the client device 101 copies the contents of the cookie stored in the cookie data area 112 of the client device 101 into the request (502). In the previous example, the client device 101 sets the contents including the cookie name as A and the cookie value as 1 to the request and transmits the request to the web server device 121 (503). The web server device 121 receives the request that includes the cookie (A=1), thereby recognizing that A=1 is stored in the cookie data area 112 of the client device 101.

When the web server device 121 transmits the response where the script code is inserted into the response body to the client device (551), the client device 101 can set, change, and delete the contents of the cookie that are stored in the cookie data area 112, using the script code that is included in the received response (505).

Meanwhile, the proxy server device 141 stores the response in the cache data area 153 (511) and returns the response to the client device 101 (512). In this case, the proxy server 141 acquires the response 513 that is generated according to another request and stored in the cache data area 153 (503), and returns the response to the client device 101 (514). As described above, because of a security problem, the set cookie instruction that is included in the response header is deleted when the response is stored in the cache data area 153 (511). Accordingly, in the response that is generated by the web server device 121 and the response that is generated by the proxy server device 141, their formats may be different from each other.

The cache hit determining method according to this embodiment will be described using a process flow of the client device 101, the web server device 121, and the proxy server device 141.

Figure 6:
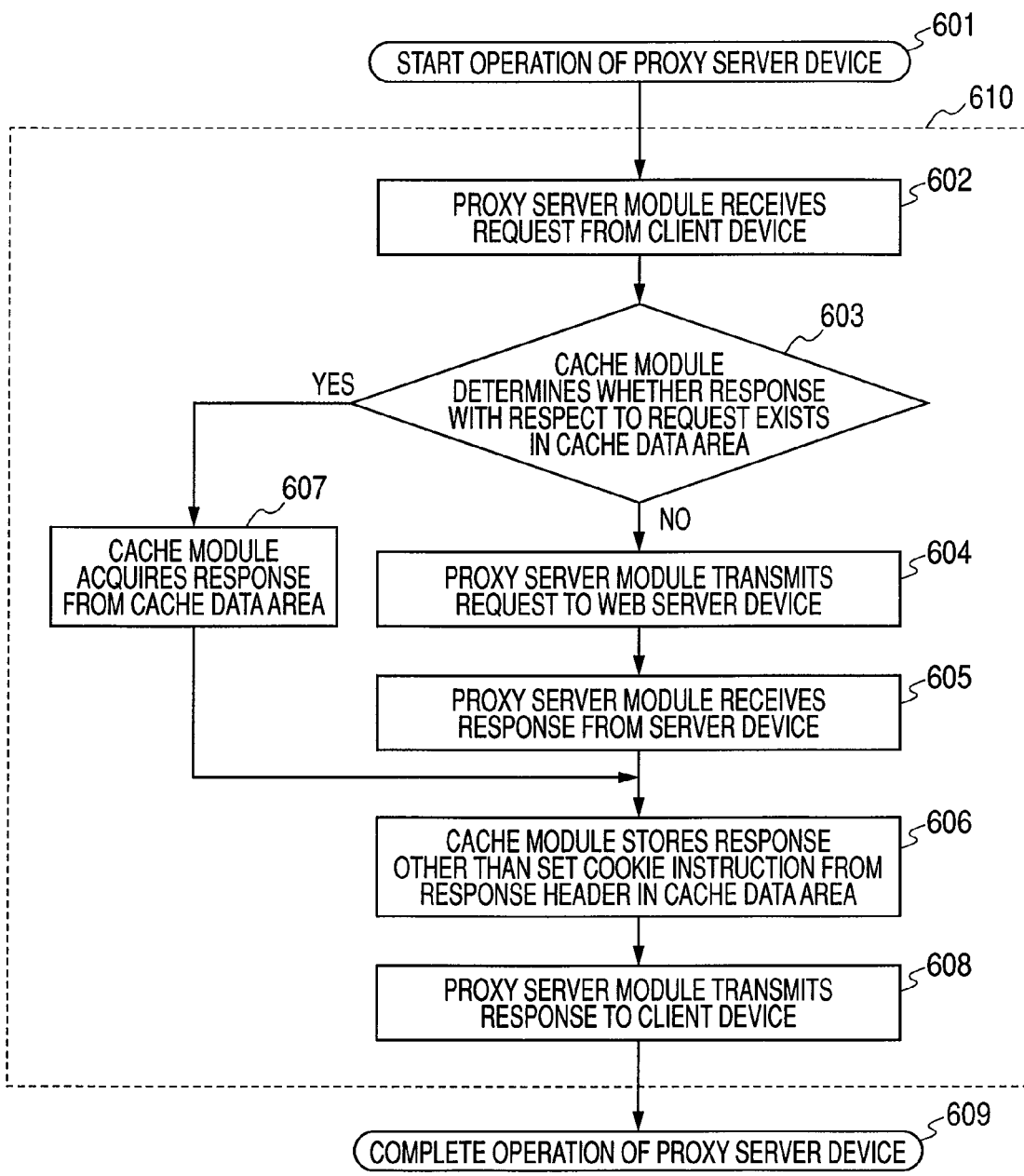
FIG. 6 is a diagram illustrating a process flow of a proxy server device.

FIG. 6 shows a process flow of the proxy server device 141. First, the proxy server module receives the request from the client device (Step 602). Next, the cache module inspects whether the response with respect to the request exists in the cache data area 153 (Step 603). As the inspection result, when the response does not exist, the proxy server module transmits the request to the web server device (Step 604). In addition, the proxy server module receives the response from the server device (Step 605). Next, as denoted by reference numerals 511 and 512 in FIG. 5, the cache module stores the response where the set cookie instruction is deleted from the response header in the cache data area (Step 606). Meanwhile, as the inspection result, when the response exists, as denoted by reference numeral 513 in FIG. 5, the cache module reads out the response from the cache data area (Step 607). Finally, as denoted by reference numeral 514 in FIG. 5, the proxy server module transmits the response to the client device (Step 608).

Figure 7:
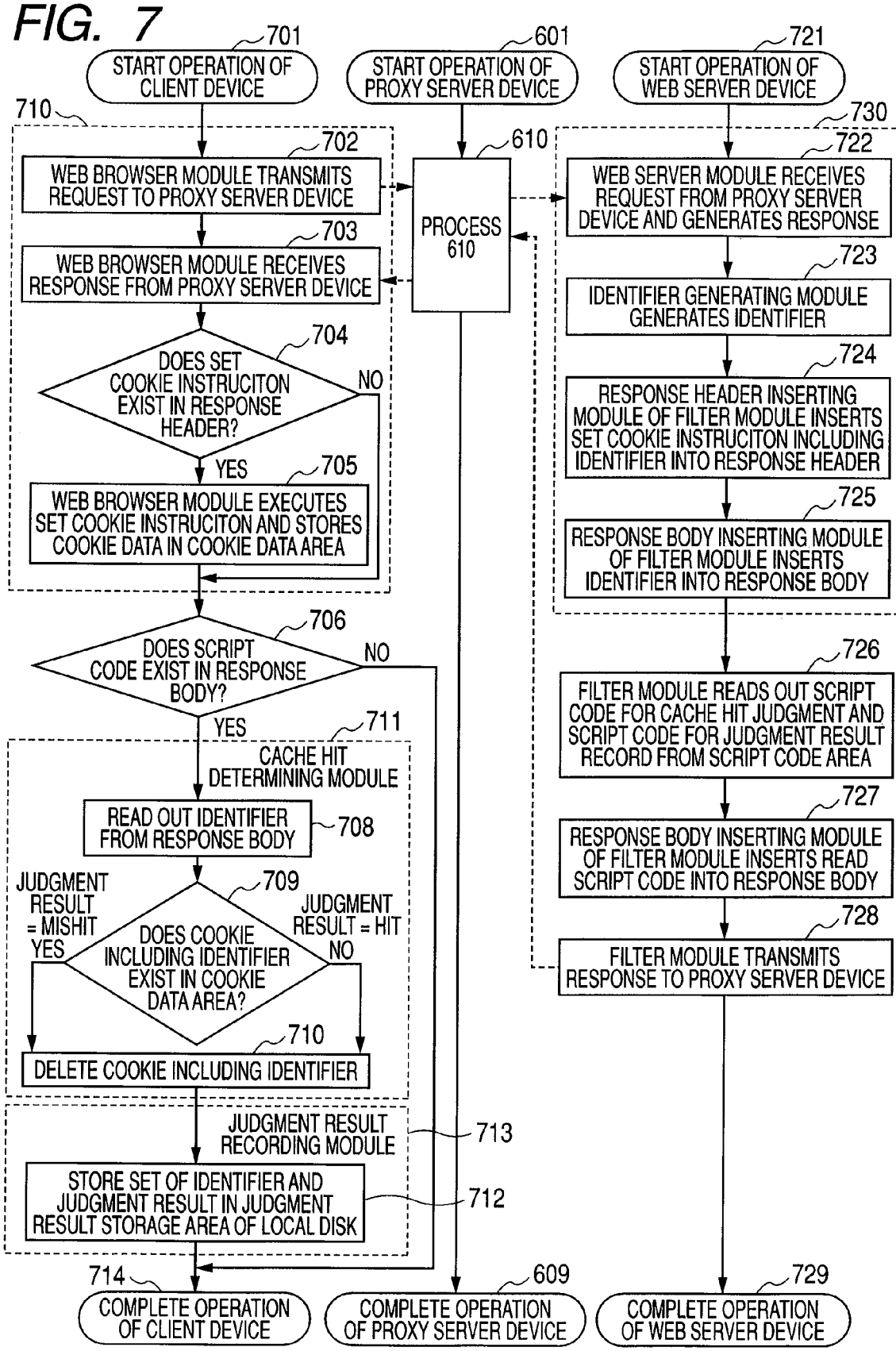
FIG. 7 is a diagram illustrating a process flow of a client device, a proxy server device, and a web server device according to a first embodiment.

FIG. 7 shows a process flow of the entire system that includes a client device 101, a web server device 121, and a proxy server device 142. In this case, a process flow for each device will be described.

First, in the web server device 121, the web server module receives the request from the proxy server device, and generates the response with respect to the request (Step 722). Further, the identifier generating module generates an identifier with respect to the generation of the response (Step 723). The execution order of Steps 722 and 723 may be reversed or Steps 722 and 723 may be simultaneously executed.

Next, the response header inserting module of the filter module inserts into the response header the set cookie instruction that sets the value including the identifier generated in Step 723 as the cookie name (Step 724). Further, the response body inserting module inserts the identifier generated in Step 723 in the response body (Step 725). The execution order of Steps 724 and 725 may be reversed or Steps 724 and 725 may be simultaneously executed. Hereinafter, the processes that correspond to Steps 722 to 725 are collectively called a process 730.

Next, the filter module reads out the script code 207 for a cache hit determination and the script code 202 for a determination result record from the script code area 134 (Step 726). The script codes 207 and 202 are inserted into the response body by the response body inserting module (Step 727). At this time, the script code 207 for a cache hit determination is inserted into a portion of the response body that is analyzed at earlier timing than the script code 202 for a determination result record, such that the script code 207 for a cache hit determination is executed at earlier timing than the script code 202 for a determination result record. Finally, the filter module transmits the response to the proxy server device (Step 728).

Next, a process flow of the client device 101 will be described. In the client device 101, first, the web browser module transmits the request to the proxy server device (Step 702). In addition, the web browser module receives the response from the proxy server device (Step 703). Next, the web browser module inspects whether the set cookie instruction exists in the received response header (Step 704). When the set cookie instruction exists, the web browser module executes the set cookie instruction and stores cookie data in the cookie data area (Step 705). When the set cookie instruction does not exist, the web browser module executes no process. Hereinafter, the processes that correspond to Steps 702 to 705 are collectively called a process 710.

The web browser module inspects whether the script code is included in the response body (Step 706). When the script code is included, the script code is executed by the script engine module. In this embodiment, by the process that corresponds to Step 726 of the web server device, the script code for a cache hit determination and the script code for a determination result record are inserted into the response body, and the script code for a cache hit determination is first executed.

The process flow of the script code for a cache hit determination corresponds to a process 711 of FIG. 7. During the process 711, first, the cache hit determining module reads out an identifier from the response body (Step 708). Next, the cache hit determining module inspects whether cookie data including an identifier as a cookie name exists in the cookie data area of the client device (Step 709). When the corresponding cookie data exists, it can be recognized that the response executed in Step 705, that is, the response received in Step 703 is the response generated by the web server device. Accordingly, the determination result becomes a mishit. Meanwhile, when the corresponding cookie data does not exist, it is determined in Step 704 that the set cookie instruction does not exist, and it can be recognized that the cookie data to be inspected is not stored in the cookie data area. That is, it can be recognized that the corresponding response is not the response generated by the server device but the response read out from the cache data area of the proxy server device. That is, the cache hit is made and the determination result becomes a hit. If the determination result is output, the cookie data including the identifier in the cookie name is not necessary, thus, the cookie data is deleted (Step 710). Next, the determination result recording module is executed. The determination result recording module stores the determination result from the cache hit determining module in a local disk (Step 712). Further, when the determination result is stored in the local disk, a set of the determination result and the identifier is stored therein. Hereinafter, all of the processes that are executed by the determination result recording module are collectively called a process 713.

On the basis of the above-described process flows, the client device can determine whether the response is generated by the web server device or read out from the cache data area, and can store the determination result in the local disk.

Further, the above-described hardware and software constituent elements may be partially removed and the connection relationship therebetween is not limited to the connection relationship shown in FIG. 1. For example, the number of each of the client device 101, the web server device 121, and the proxy server device 141 is not limited to one, and the number of each of the processor, the local disk, the input/output device, and the network interface that are included in each device is not limited to one. Alternatively, the proxy server device 141 and the web server device 121 may be realized by the same hardware and hardware of each device may be composed of the same hardware in actuality.

In the above description, the proxy server device 141 stores a response in the cache data area 153. When the client device 101 receives the response, the cache hit can be detected. However, even in the case of the response that is stored in the cache data area 133 of the web server device 121 or the cache data area 111 of the client device 101, the cache hit can be detected. In this embodiment, the method that detects the cache hit has been described, but an apparatus that realizes the above method may be configured.

A first modification of the first embodiment will be described using FIG. 8. In this case, only a difference between the first modification and the first embodiment is described and the same portions as the portions described in the first embodiment are not described.

Figure 8:
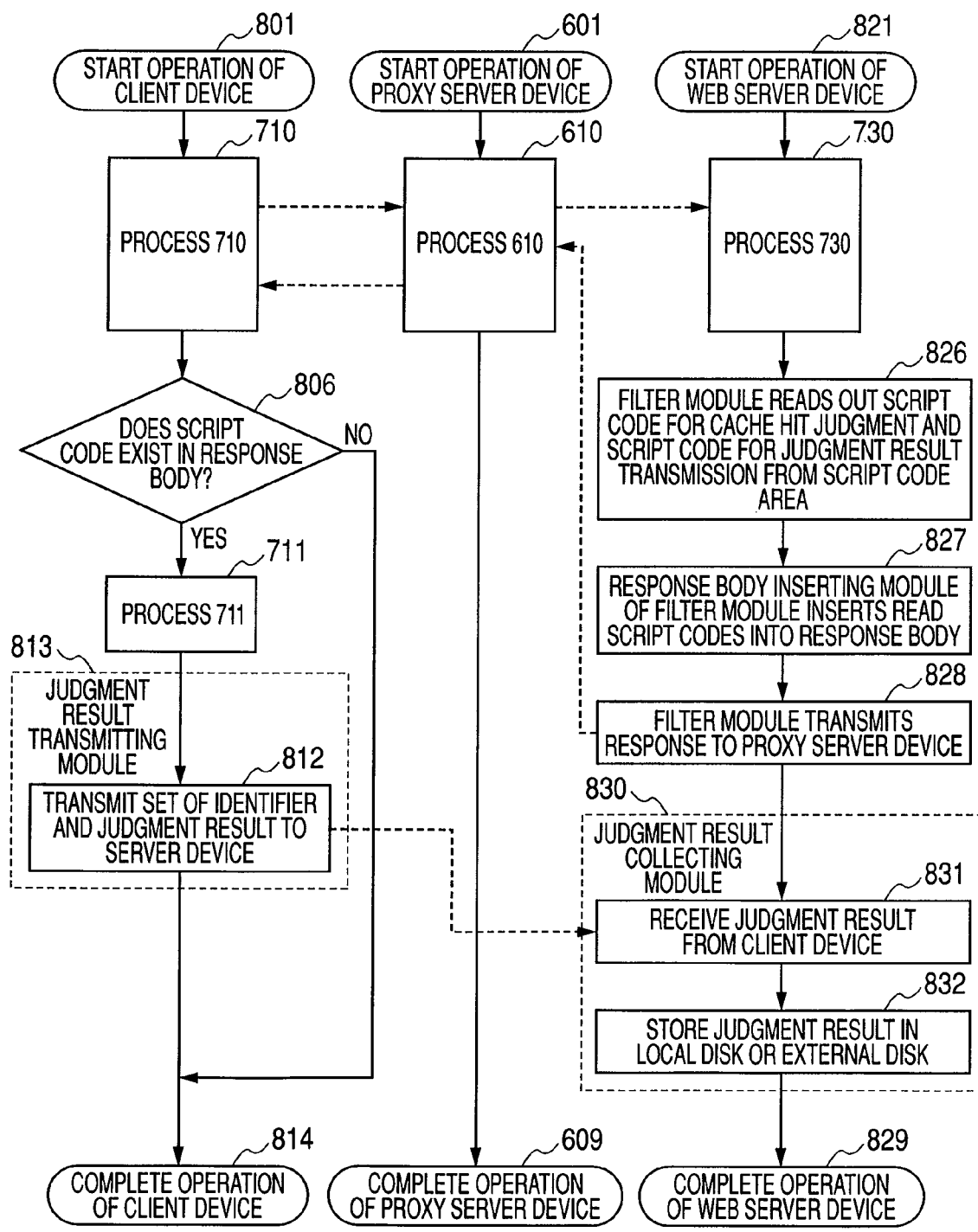
FIG. 8 is a diagram illustrating a process flow of a client device, a proxy server device, and a web server device according to a first modification.

FIG. 8 shows a process flow of the entire system that includes a client device 101, a web server device 121, and a proxy server device 142. In this case, a process flow for each device will be described. The process of the proxy server device is the same as that in the first embodiment.

In this modification, different from the first embodiment, the script code 201 for a cache hit determination and the script code 203 for a determination result transmission are stored in the script code areas 134 and 154. Further, a determination result collection program is stored in the memory 135 of the web server device 121 and executed by the processor 123.

First, a process flow of the web server device 121 will be described. During the process 730, the web server device generates the response and the identifier with respect to the request from the proxy server device and inserts the response and the identifier in the response body. Next, the filter module reads out the script code 201 for a cache hit determination and the script code 203 for a determination result transmission from the script code area (Step 826). Further, the filter module inserts into the response body the script code that is read out by the response body inserting module of the filter module in Step 826 (Step 827). Finally, the filter module transmits the response to the proxy server device (Step 828). Further, in the web server device 121, the determination result collecting module 830 receives the cache hit determination result from the client device 101 (Step 831) and stores a set of the received determination result and the identifier in the judgment result storage area 125 of the local disk 124 (Step 832). Further, the storage destination may be an external disk that is connected to the input/output device 126.

Next, a process flow of the client device 101 will be described. In the client device 101, first, in the process 710, the transmission of the request and the reception of the response are performed. When the set cookie instruction is included in the response header as in the response B 421, the cookie data is set to the cookie data area. Next, it is inspected whether the script code is included in the response body. When the script code is included in the response body, the cache hit determining module is executed by the process 711, and the cache hit determination result is set on the memory 135. In the second embodiment, subsequent to the process 711, the script code 203 for a determination result transmission that is inserted into the response body is executed by the processor 123, and the process 813 is executed. This process transmits a set of the cache hit determination result set by the process 711 and the identifier included in the response body to the web server device 121 (Step 812).

By the above process flow, the web server device can recognize a determination result on whether the response received by the client device is generated by the web server device or read out from the cache data area, and store the determination result in the local disk.

Further, the determination result collecting module 830 may not be executed by the web server device 121 that performs generation of the response, and may be executed on the proxy server device 141 or another web server device. In this case, the transmission destination of Step 812 also becomes a device where the determination result collecting module 830 is executed.

This modification has been described as a method, similar to the first embodiment, but an apparatus that realizes the above method may be configured. Further, the hardware configuration or the software configuration is also not limited to the above example, similar to the first embodiment.

A second modification will be described using FIG. 9. In this case, only a difference between the second modification and the first embodiment is described and the same portions as the portions described in the first embodiment are not described.

Figure 9:
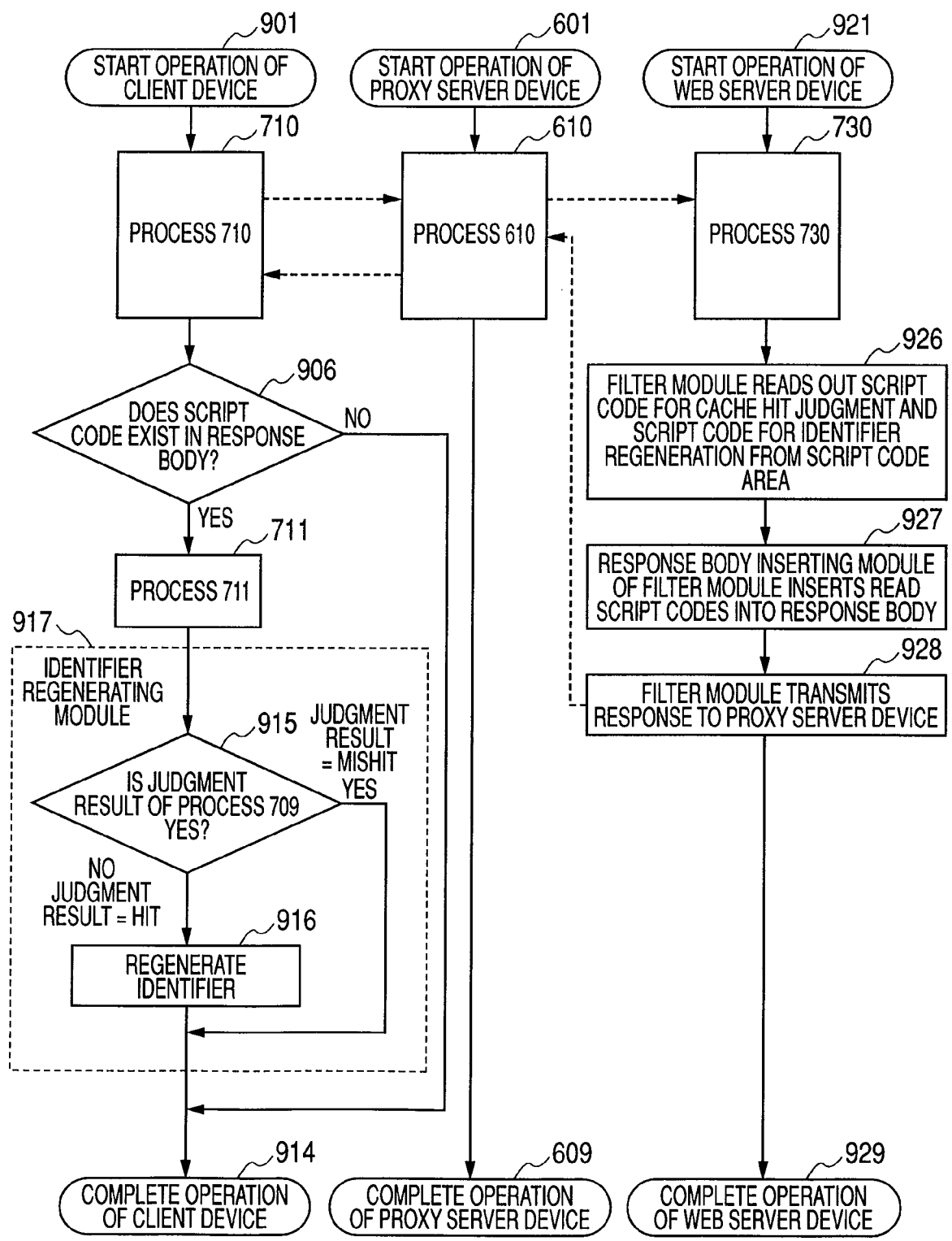
FIG. 9 is a diagram illustrating a process flow of a client device, a proxy server device, and a web server device according to a second modification.

FIG. 9 shows a process flow of the entire system that includes a client device 101, a web server device 121, and a proxy server device 142. In this case, a process flow for each device will be described.

A process of the proxy server device is the same as the process of the first embodiment. In this modification, different from the first embodiment, the script code 201 for a cache hit determination and the script code 204 for identifier regeneration are stored in the script code areas 134 and 154.

First, a process flow of the web server device 121 will be described. During the process 730, a response and an identifier are generated with respect to a request from the proxy server device and inserted into a response body. Next, the filter module reads out the script code 201 for a cache hit determination and the script code 204 for identifier regeneration from the script code area (Step 926). Further, the response body inserting module of the filter module inserts into the response body the script code that is read out in Step 926 (Step 927). Finally, the filter module transmits the response to the proxy server device (Step 928).

Next, a process flow of the client device 101 will be described. In the client device 101, first, in the process 710, the transmission of the request and the reception of the response are performed. When the set cookie instruction is included in the response header, the cookie data is set to the cookie data area. Next, it is inspected whether the script code is included in the response body. When the script code is included in the response body, the cache hit determining module is executed by the process 711, and the cache hit determination result is set on the memory 135.

In the second modification, subsequent to the process 711, the script code 204 for identifier regeneration that is inserted into the response body is read out and executed by the processor 123, and the process 917 is executed. During this process, when the cache hit determination result that is set by the process 709 is a hit, the processor 123 regenerates the identifier that is included in the response body and sets the identifier as a different value (Step 916). As the method of regenerating the identifier, a method is exemplified in which a counting value of the number of times the identifier is determined as the cache hit by the process 711 is stored in the local disk 104 of the client device 101, and the counting value and the MAC address of the network interface 106 of the client device 101 are added to the identifier, but the present invention is not limited thereto.

By the above process flow, when the received response is read out from the cache data area, the client device 101 can set the identifier as a value that is different from the previous value of when the response is generated by the web server device 121. As a result, since a different identifier is applied for each response, the identifier can be used as a value that discriminates each response.

This modification has been described as a method, similar to the first embodiment, but an apparatus that realizes the above method may be configured. Further, the hardware configuration or the software configuration is also not limited to the above example, similar to the first embodiment.

Figure 10:
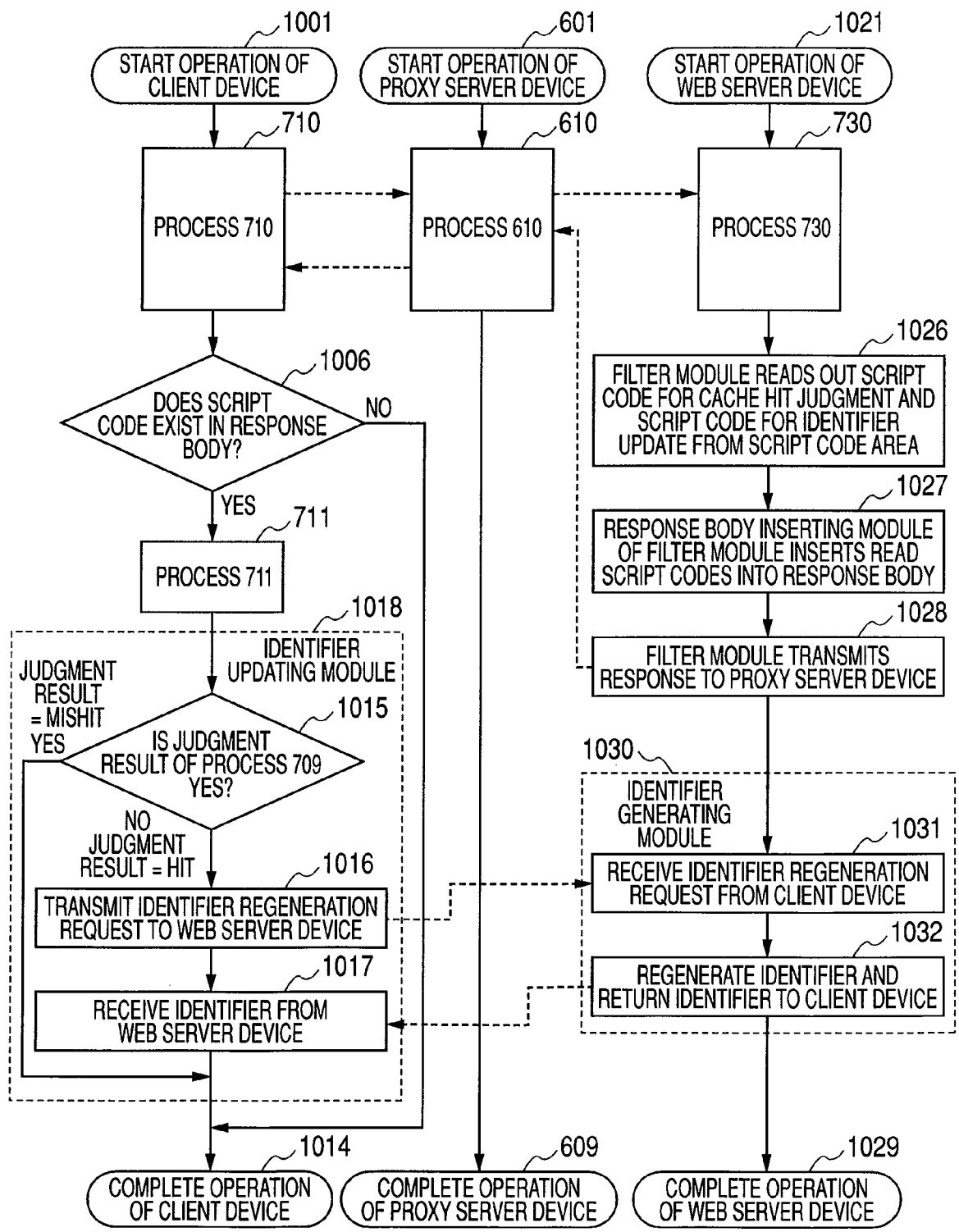
FIG. 10 is a diagram illustrating a process flow of a client device, a proxy server device, and a web server device according to a third modification.

A third modification will be described using FIG. 10. In this case, only a difference between the third modification and the first embodiment is described and the same portions as the portions that are described in the first embodiment are not described. FIG. 10 shows a process flow of the entire system that includes a client device 101, a web server device 121, and a proxy server device 142.

In this case, a process flow for each device will be described. A process of the proxy server device is the same as the process of the first embodiment. In this modification, different from the first embodiment, the script code 201 for a cache hit determination and the script code 205 for identifier update are stored in the script code areas 134 and 154.

First, a process flow of the web server device 121 will be described. During the process 730, a response and an identifier are generated with respect to a request from the proxy server device and inserted into a response body. Next, the filter module reads out the script code 201 for a cache hit determination and the script code 205 for identifier update from the script code area 134 (Step 1206). Further, the response body inserting module of the filter module inserts into the response body the script code that is read out in Step 1026 (Step 1027).

Finally, the filter module transmits the response to the proxy server device (Step 1028). Further, in the web server device 121, the identifier generating module 1030 receives the identifier regeneration request from the client device 101 (Step 1031). In addition, similar to Step 723, the identifier is generated and returned to the client device 101 (Step 1032).

Next, a process flow of the client device 101 will be described. In the client device 101, first, in the process 710, the transmission of the request and the reception of the response are performed. When the set cookie instruction is included in the response header, the cookie data is set to the cookie data area. Next, it is inspected whether the script code is included in the response body. When the script code is included in the response body, the cache hit determining module is executed by the process 711, and the cache hit determination result is set on the memory 135.

In the third modification, subsequent to the process 711, the script code 205 for identifier update that is inserted into the response body is executed by the processor 123, and the process 1018 is executed. During this process, when the cache hit determination result that is set by the process 711 is a hit, updating of the identifier that is included in the response body is performed by transmitting an identifier regeneration request to the web server device 121 (Step 1016). Next, an identifier after regeneration is received from the web server device 121 (Step 1017).

By the above process flow, when the received response is read out from the cache data area, the client device 101 can set the identifier as a value that is different from the previous value of when the response is generated by the web server device 121. As a result, since a different identifier is applied for each response, the identifier can be used as a value that discriminates each response.

Further, the identifier generating module 1030 may not be executed by the web server device 121 that performs generation of the response, and may be executed on the proxy server device 141 or another web server device. In this case, a transmission destination of the request of Step 1016 also becomes a device where the identifier generating module 1030 is executed.

This modification has been described as a method, similar to the first embodiment, but an apparatus that realizes the above method may be configured. Further, the hardware configuration or the software configuration is also not limited to the above example, similar to the first embodiment.

Figure 11:
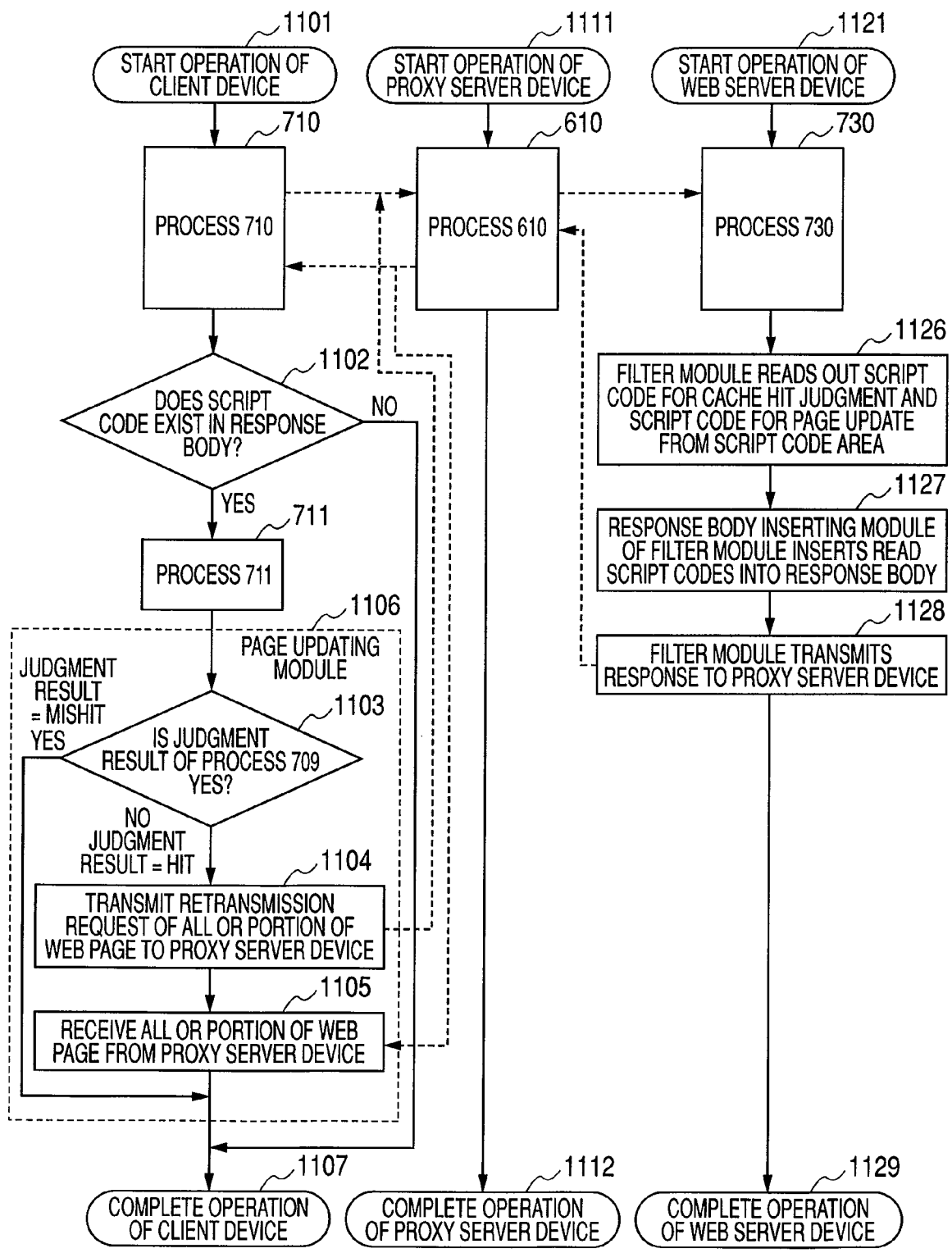
FIG. 11 is a diagram illustrating a process flow of a client device, a proxy server device, and a web server device according to a fourth modification.

A fourth modification will be described using FIG. 11. In this case, only a difference between the fourth modification and the first embodiment is described and the same portions as the portions that are described in the first embodiment are not described. FIG. 11 shows a process flow of the entire system that includes a client device 101, a web server device 121, and a proxy server device 142.

In this case, a process flow for each device will be described. When a retransmission request is received from the client device 101, the proxy server device executes the same processes as the first embodiment, except that the proxy server device unconditionally sets a determination result of Step 603 shown in FIG. 6 as 'No' and then Steps after Step 604 are executed. In this modification, as shown in FIG. 2, different from the first embodiment, the script code 201 for a cache hit determination and the script code 206 for page update are stored in the script code areas 134 and 154.

First, a process flow of the web server device 121 will be described. During the process 730, a response and an identifier are generated with respect to a request from the proxy server device and inserted into a response body. Next, the filter module reads out the script code 201 for a cache hit determination and the script code 206 for page update from the script code area (Step 1126). Further, the response body inserting module of the filter module inserts into the response body the script code that is read out in Step 1126 (Step 1127). Finally, the filter module transmits the response to the proxy server device (Step 1128).

Next, a process flow of the client device 101 will be described. In the client device 101, first, in the process 710, the transmission of the request and the reception of the response are performed. When the set cookie instruction is included in the response header, the cookie data is set to the cookie data area. Next, it is inspected whether the script code is included in the response body. When the script code is included in the response body, the cache hit determining module is executed by the process 711, and the cache hit determination result is set on the memory 135.

In the fourth modification, subsequent to the process 711, the script code 206 for page update that is inserted into the response body is executed by the processor 123, and the process 1106 is executed. During this process, when the cache hit determination result that is set by the process 709 is a hit, a retransmission request of all or a portion of a web page is transmitted to the proxy server device 141 (Step 1104). Next, all or the portion of the web page is received from the proxy server device 141 (Step 1105). A method of requesting to retransmit only the portion of the web page in the retransmission request is exemplified as a method in which a specific print is added to a portion of an HTML document of a web page where a retransmission is needed, and the print is designated in the retransmission request, but the present invention is not limited thereto.

By the above process flow, when the received response is read out from the cache data area, the client device 101 can update all or the portion of the web page. As a result, a load of the network or the server device can be reduced while a display of the web page is updated to maintain a newest state. This modification has been described as a method, similar to the first embodiment, but an apparatus that realizes the above method may be configured. Further, the hardware configuration or the software configuration is also not limited to the above example, similar to the first embodiment.

A fifth modification will be described using FIG. 12. In this case, only a difference between the fifth modification and the first embodiment is described and the same portions as the portions that are described in the first embodiment are not described.

Figure 12:
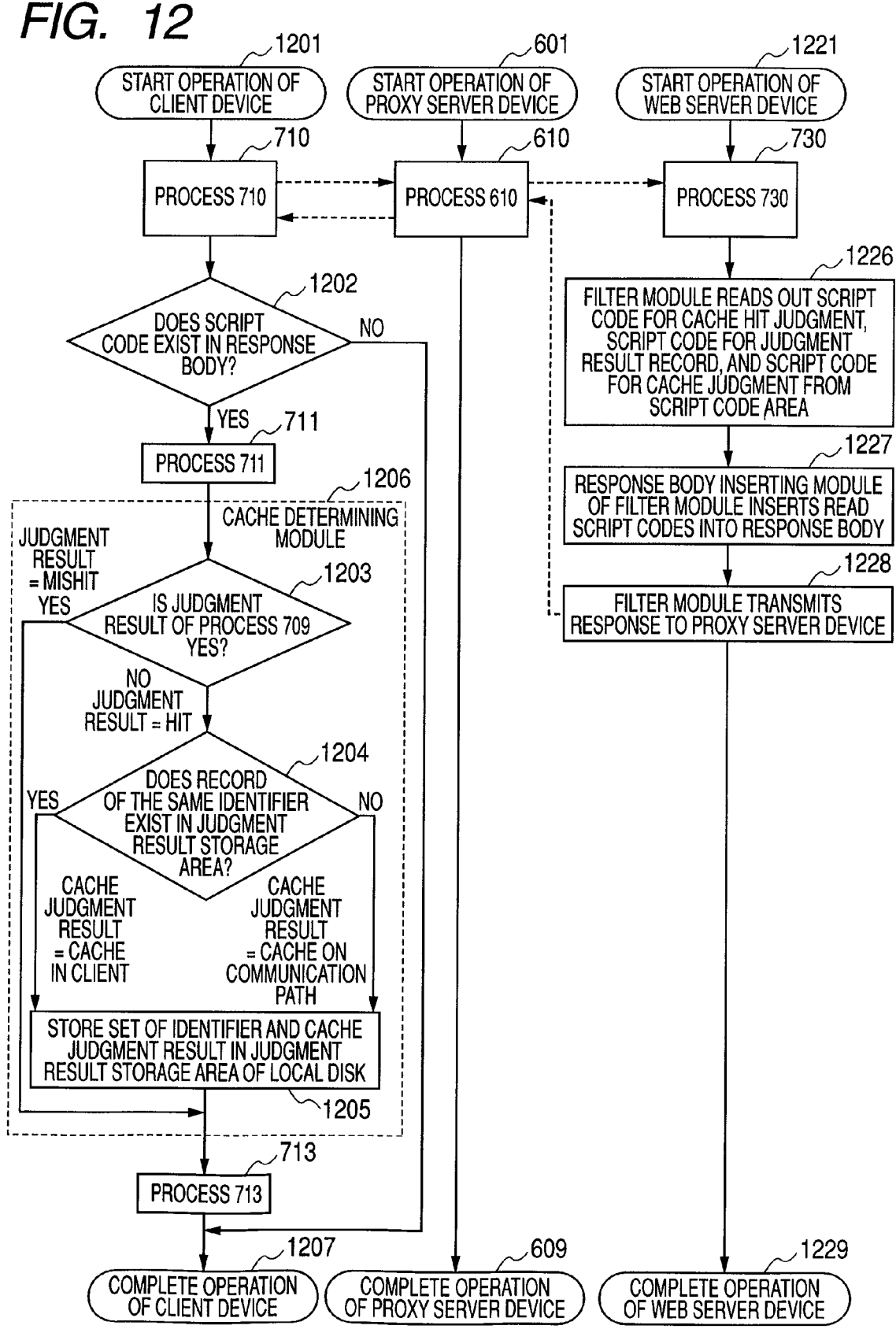
FIG. 12 is a diagram illustrating a process flow of a client device, a proxy server device, and a web server device according to a fifth modification.

FIG. 12 shows a process flow of the entire system that includes a client device 101, a web server device 121, and a proxy server device 142. In this case, a process flow for each device will be described. The process of the proxy server device is the same as the process of the first embodiment.

In this modification, different from the first embodiment, the script code 201 for a cache hit determination and the script code 207 for a cache determination are stored in the script code areas 134 and 154. First, a process flow of the web server device 121 will be described. During the process 730, a response and an identifier are generated with respect to a request from the proxy server device and inserted into a response body. Next, the filter module reads out the script code 201 for a cache hit determination and the script code 207 for a cache determination from the script code area (Step 1226). Further, the response body inserting module of the filter module inserts into the response body the script code that is read out in Step 1226 (Step 1227). Finally, the filter module transmits the response to the proxy server device (Step 1228).

Next, a process flow of the client device 101 will be described. In the client device 101, first, in the process 710, the transmission of the request and the reception of the response are performed. When the set cookie instruction is included in the response header, the cookie data is set to the cookie data area. Next, it is inspected whether the script code is included in the response body. When the script code is included in the response body, the cache hit determining module is executed by the process 711, and the cache hit determination result is set on the memory 135.

In the fifth modification, subsequent to the process 711, the script code 207 for a cache determination that is inserted into the response body is read out by the processor 123, and the process 1206 is executed. During this process, when the cache hit determination result that is set by the process 709 is a hit, the cache determining module inspects whether a record of the same identifier as the identifier inserted into the response body exists in records that are stored in the judgment result storage area 105 (Step 1204). When the same identifier exists, the cache determining module sets the cache determination result to the cache in the client. When the same identifier does not exist, the cache determining module sets the cache determination result to a cache on a communication path. The cache determination result is set on the memory 113. Next, a set of the cache determination result and the identifier is stored in the judgment result storage area 105 of the local disk 104 (Step 1205). The cache in the client and the cache on the communication path are described in detail below using FIGS. 15 and 16. Subsequent to the process 1206, the process 713 is executed, and a set of the cache hit determination result and the identifier is stored in the judgment result storage area 105.

By the above process flow, the client device 101 can determine whether the received response is read out from the cache data area and whether the cache is the cache in the client or the cache on the communication path. That is, according to this modification, it is possible to specify which of caches on a network between the client and the sever stores the response with respect to the request. This modification has been described as a method, similar to the first embodiment, but an apparatus that realizes the above method may be configured. Further, the hardware configuration or the software configuration is also not limited to the above example, similar to the first embodiment.

Figure 13:
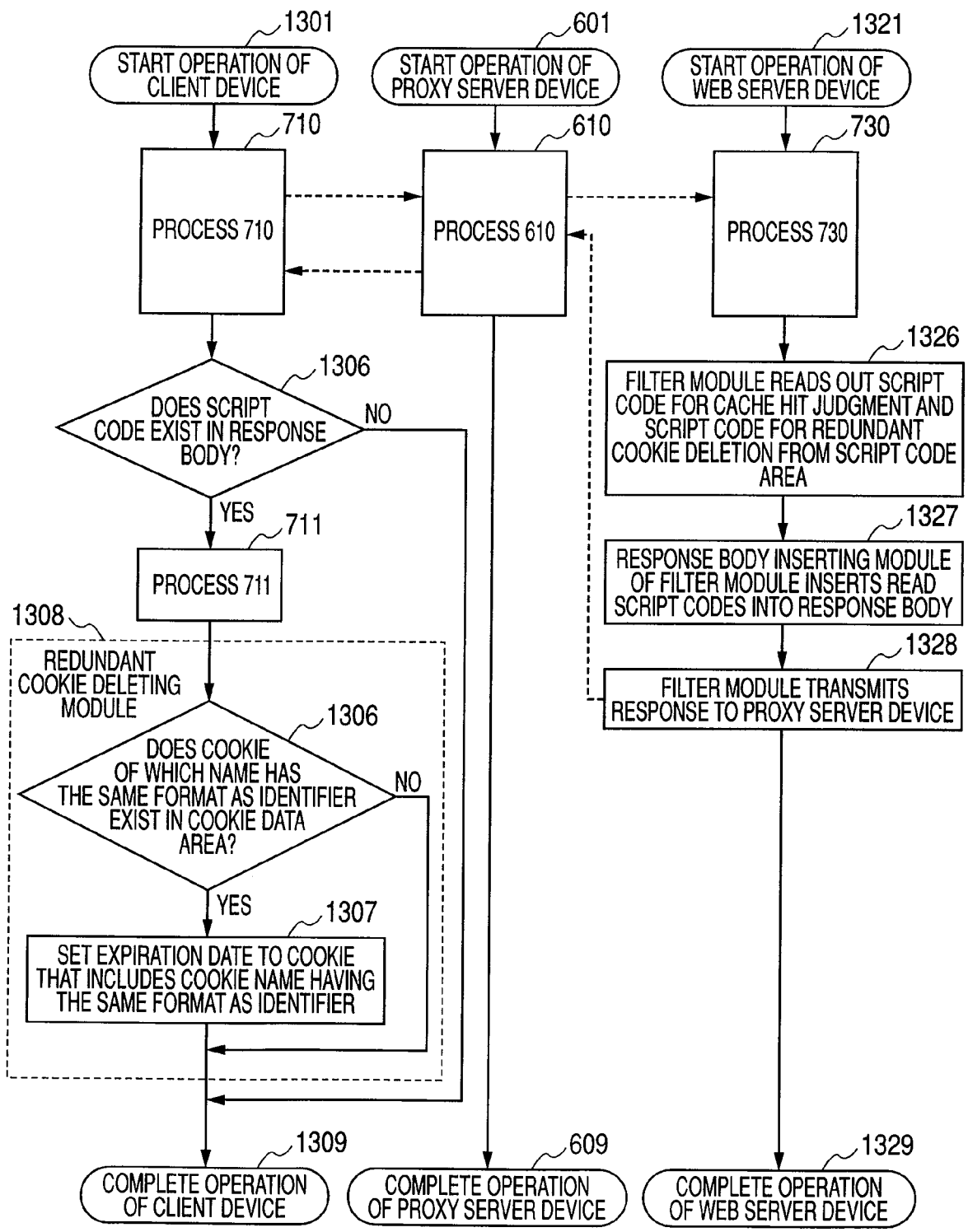
FIG. 13 is a diagram illustrating a process flow of a client device, a proxy server device, and a web server device according to a sixth modification.

A sixth modification will be described using FIG. 13. In this case, only a difference between the sixth modification and the first embodiment is described and the same portions as the portions that are described in the first embodiment are not described. FIG. 13 shows a process flow of the entire system that includes a client device 101, a web server device 121, and a proxy server device 142. In this case, a process flow for each device will be described. The process of the proxy server device is the same as the process of the first embodiment. In this modification, different from the first embodiment, the script code 201 for a cache hit determination and the script code 208 for redundant cookie deletion are stored in the script code areas 134 and 154.

First, a process flow of the web server device 121 will be described. During the process 730, the web server device generates a response and an identifier with respect to a request from the proxy server device and inserts the response and the identifier into a response body. Next, the filter module reads out the script code 201 for a cache hit determination and the script code 208 for redundant cookie deletion from the script code area 134 (Step 1326). Further, the response body inserting module of the filter module inserts into the response body the script code that is read out in Step 1326 (Step 1327). Finally, the filter module transmits the response to the proxy server device (Step 1328).

Next, a process flow of the client device 101 will be described. In the client device 101, first, in the process 710, the transmission of the request and the reception of the response are performed. When the set cookie instruction is included in the response header, the cookie data is set to the cookie data area. Next, it is inspected whether the script code is included in the response body. When the script code is included in the response body, the cache hit determining module is executed by the process 711, and the cache hit determination result is stored in the memory 135.

In the sixth modification, subsequent to the process 711, the script code 208 for redundant cookie deletion that is inserted into the response body is read out by the processor 123, and the process 1308 is executed. During the process 1308, a redundant cookie deleting module inspects whether a cookie where a cookie name has the same format as an identifier exists in the cookie data area 105 (Step 1306). When the cookie exists, the redundant cookie deleting module sets an expiration date of the cookie (Step 1307). In this case, the same format as the identifier means that, when the identifier is composed of a character string of ten characters "AAA0000001" and three head characters are necessarily "AAA", the cookie name is, for example, "AAA0000002" or "AAA9999999".

The web server 121 generates a response of the web page and the client device 101 receives the response. However, since it takes time to receive the response, a redundant cookie may be stored in the cookie data area according to the set cookie instruction inserted into the response header to determine a cache hit, when the previous response is read out from the cache data area 111 and a process is executed. By the above process flow, the client device 101 can prevent the redundant cookie from being stored in the cookie data area.

This modification has been described as a method, similar to the first embodiment, but an apparatus that realizes the above method may be configured. Further, the hardware configuration or the software configuration is also not limited to the above example, similar to the first embodiment.

A seventh modification will be described using FIG. 14.

Figure 14:
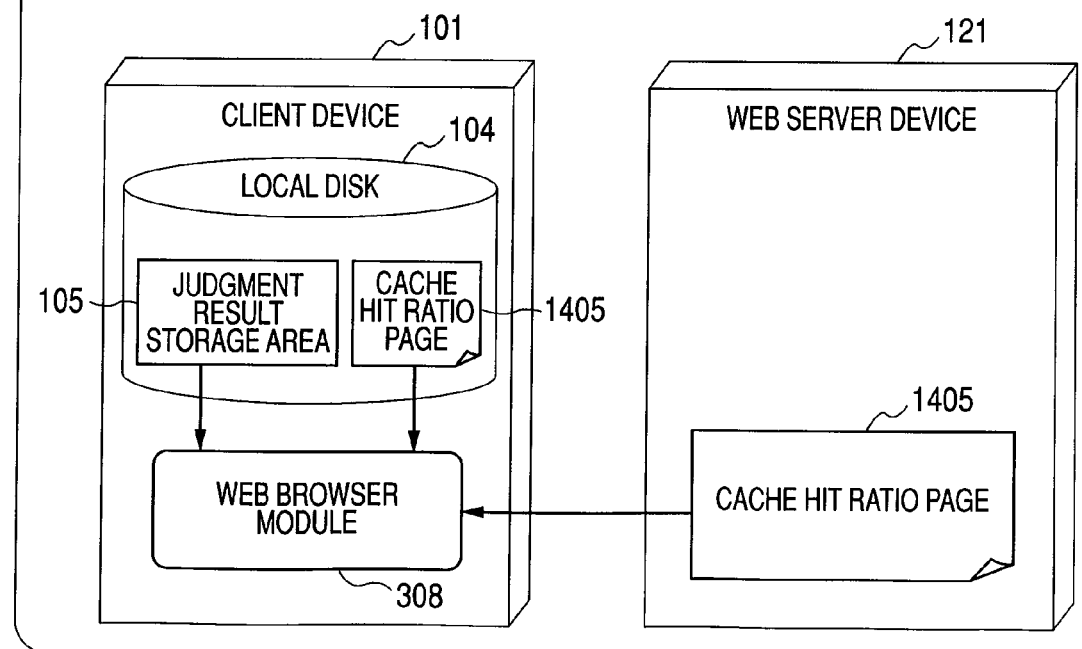
FIG. 14 is a diagram illustrating an example of a screen that displays a cache hit ratio measurement result.

FIG. 14 shows a display screen of a cache hit ratio that is realized by partially changing the process flow of the fifth modification and adding new processes to the process flow of the fifth modification. In this case, only a difference between the fifth modification and the seventh modification is described and the same portions as the portions that are described in the fifth modification are not described. First, during the process 1205, when an identifier and a cache determination result are stored in the judgment result storage area 105, a uniform resource locator (URL) of a web page is further stored. The URL is a portion of a uniform resource identifier (URI) that is included in a request transmitted by the client device 101. Further, even when a record of the same identifier already exists in the judgment result storage area 105, an identifier is additionally written and stored without overwrite. The identifier is stored by the same method, even in the process 713.

Next, a cache hit ratio page 1405 is stored in the local disk 104 of the client device 101 or the web server device 121. The cache hit ratio page 1405 is read out in the web browser module 308, a cache hit determination result and a cache determination result are read out from the judgment result storage area 105, and a cache hit ratio list 1402 is displayed on the screen 1401 that is connected to the input/output device 102 of the client device 101. In the cache hit ratio list 1402, a cache hit ratio table 1403 is included, and a URL, the number of times of access, and a cache hit ratio are displayed for each web page. Theses displays are generated from the cache hit determination result and the cache determination result that are read out from the judgment result storage area 105. The number of times of access is the number of times of recording the same URL. The cache hit ratio is obtained by calculating a ratio between the number of records determined as cache hits and the number of times of access for each URL on the basis of the cache hit determination result. The cache in the client and the cache on the communication path can be recognized from the cache determination result.

This modification may implement a method in which the same changes and additions are performed with respect to the first embodiment and records stored in the judgment result storage areas 105, 125, and 145 are read out. In this case, in the cache hit ratio table 1403, a cache hit ratio that is obtained by summing cache hit ratios of the cache in the client and the cache on the communication path is displayed.

An eighth modification will be described using FIG. 17. In this case, only a difference between the eighth modification and the first embodiment is described and the same portions as the portions that are described in the first embodiment are not described. FIG. 17 shows a process flow of the entire system that includes a client device 101, a web server device 121, and a proxy server device 142. In this case, a process flow for each device will be described. A process of the proxy server device is the same as the process of the first embodiment.

In this modification, different from the first embodiment, the script code 201 for a cache hit determination, the script code 202 for a determination result record, the script code 207 for a cache determination, the script code 204 for identifier regeneration, the script code 209 for event acquisition, and the script code 210 for an event record are stored in the script code areas 134 and 154. First, a process flow of the web server device 121 will be described. During the process 730, the web server device 121 generates a response and an identifier with respect to a request from the proxy server device and inserts the response and the identifier into a response body. Next, the filter module reads out the script code 201 for a cache hit determination, the script code 202 for a determination result record, the script code 207 for a cache determination, the script code 204 for identifier regeneration, the script code 209 for event acquisition, and the script code 210 for an event record, from the script code area (Step 1726). Further, the response body inserting module of the filter module inserts into the response body the script code that is read out in Step 1726 (Step 1727). Finally, the filter module transmits the response to the proxy server device (Step 1728).

Next, a process flow of the client device 101 will be described. In the client device 101, first, in the process 710, the transmission of the request and the reception of the response are performed. When the set cookie instruction is included in the response header, the cookie data is set to the cookie data area. Next, it is inspected whether the script code is included in the response body. When the script code is included in the response body, the cache hit determining module is executed by the process 711, and the cache hit determination result is set on the memory 135. Next, the processes 1206, 713, and 917 are executed, the cache determination result and the cache hit determination result are stored in the judgment result storage area, and the identifier is regenerated in the case of the cache hit.

In the eighth modification, subsequent to the process 917, the script code 209 for event acquisition that is inserted into the response body is executed by the processor 123, and the process 1705 is executed. When a display changes on a web browser or a mouse operation is generated, the web browser module 308 generates events. In the events, generated events, such as contents of the display change or contents of the mouse operation, are included as event contents. During the process 1705, the event acquiring module detects the generation of the event (Step 1703). When the events are generated, the events including event contents are recorded on a memory as an event generation history (Step 1704).

Subsequent to the process 1705, the processor 123 executes the script code 210 for an event record that is inserted into the response body, and the process 1709 is executed. First, by the process 1705, the event recording module detects whether a new event generation history is recorded on a memory (Step 1706). If it is detected that the new event generation history is recorded, a set of the identifier and the event generation history is stored in the local disk 105 (Step 1707). If the web browser is not completed, the above process is repeated. By the above process flow, the client device 101 can store the event on the web browser in the local disk for each response of the web page. This modification has been described as a method, similar to the first embodiment, but an apparatus that realizes the above method may be configured. Further, the hardware configuration or the software configuration is also not limited to the above example, similar to the first embodiment.

Combinations of the first embodiment and the first to eighth modifications are also included in the present invention.

Figure 15:
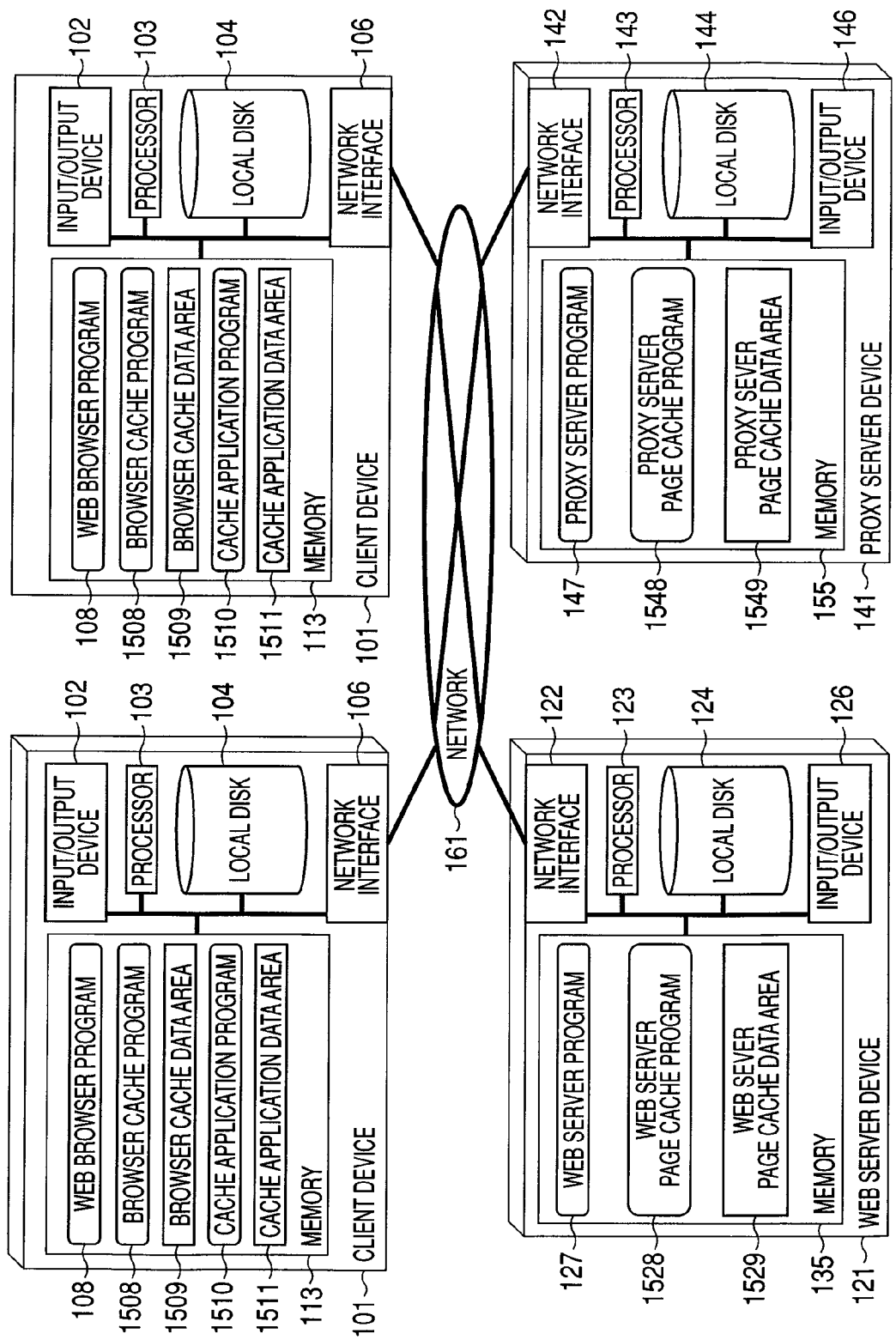
FIG. 15 is a diagram illustrating cache arrangement of a system.

Further, in the first embodiment and the first to eighth modifications, the case where the response is read out from the cache data area 153 of the proxy server device 141 has been exemplified. However, the present invention may include the case where a response is read out from a cache data area that is included in another device, with respect to the request of the client device. For example, as shown in FIG. 15, examples of the cache data area may include a browser cache data area 1509 on the client device 101, a cache application data area 1511, a web server page cache data area 1529 on the web server device 121, and a proxy server page cache data area 1549 on the proxy server device 141. The browser cache data area 1509 stores a response that is received by a web browser program 108, according to a browser cache program 1508 that operates in connection with the web browser program 108. When the web browser program 108 outputs a request, it is inspected whether a response exists in the browser cache data area 1509. When the response exists, the response is read out from the browser cache data area 1509. Another cache data area exists on a path on which a request and a response are transmitted between the client device 101, the proxy server device 141, and the web server device 121. Another cache data area stores the response, inspects whether the response corresponding to the request exists, and reads out the response and returns the response, when the response exists.

Figure 16:
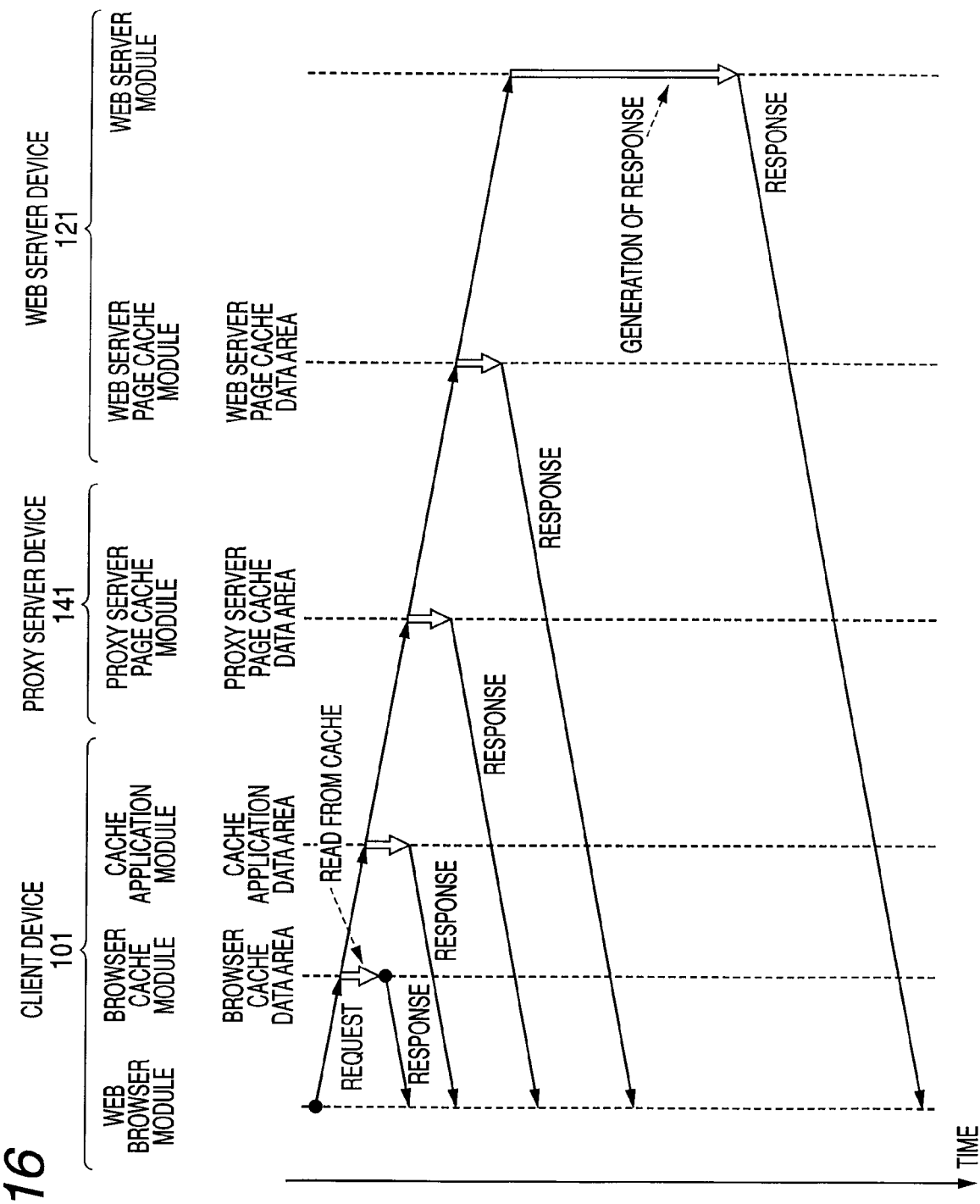
FIG. 16 is a diagram illustrating a difference of a process due to a difference of cache arrangement of a system.

FIG. 16 is a timing chart illustrating the operation of when a response is read out from each cache data area and then returned to a web browser module. In FIG. 16, the browser cache data area and the cache application data area are called caches in the client, and the other cache data areas are called caches on a communication path.

Further, in the first embodiment and the first to eighth modifications, the request of the web page and the response have been described, but the subject of the present invention is not limited to the web page. In regard to the cookie, a transmitting and receiving method of data that includes functions shown in FIG. 5 may be used, and the present invention is not limited to the cookie. That is, in the data that is returned from the server device with respect to the request from the client device, a header and a body exist in the response that includes the returned data, and the cookie does not exist in the header. In addition to data that can be read out by the client device, a program that can be executed by the client device may be inserted in the body.

In one aspect that is described in the first embodiment and the first to eighth modifications, when a web application is executed in a computer system having a cache that includes a server device, a client device, and a network used to connect the server device and the client device, in order to accurately execute the web application while the cache is effectively used, in a technology for detecting a cache hit by the client device, in the case where a response of a web page is returned from a cache in the client device or a cache between the client device and the server device with respect to the request of the web page from the client device, the client device can determine whether the corresponding response is the response returned from the cache, without inquiring the server device. Further, it is determined whether the response returned from the cache is the response returned from the cache in the client device or the response returned from the cache between the server device and the client device. When the corresponding response is the response returned from the cache, an identifier of the web page or contents of the web page are updated.

When the server device generates the web page, a program code for a cache hit determination that is executed by the client device and a unique identifier of a web page for every access given at the time of generating the web page are inserted into a response body of the web page. In addition, the server device inserts an instruction that sets a cookie including the identifier into the response header of the web page.

According to this aspect, with respect to the response that corresponds to the request of the web page from the client device, the client device executes a program included in the web page on a web browser. In order to determine whether the corresponding response is the response returned from the cache in the client device, the response returned from the cache on the communication path between the server device and the client device, or the response generated by the server device, a tool does not need to be installed in the client device, and the web application does not need to be modified in the server device.

According to another aspect, if a cache hit is not made and the client device receives the web page generated by the server device, in the client device, according to a instruction that sets a cookie including the identifier of the web page that is inserted into the response header of the web page, the cookie that includes the identifier received in the web browser is set. Next, a program code for a cache hit determination that is inserted into the response of the web page is executed. This program reads out the identifier of the web page that is inserted into the response of the web page and determines whether the cookie including the identifier exists in the cookies set in the web browser. According to the instruction that is inserted into the response header, since the cookie including the identifier is set in the web browser, it is determined that the cookie exists. In this program, the cookie is deleted after the determination result is output.

Meanwhile, in the case where the response is the response generated by the browser or the response returned from the cache that exists on the communication path between the client device and the server device, when the response of the web page is stored in the cache, the response is stored after the instruction that sets the cookie included in the response header is deleted. Thus, the obtained response header does not include the instruction that sets the cookie including the identifier of the web page, different from the case where the response of the web page that is generated by the server device is received. Accordingly, as the result that is obtained by executing the program code for a cache hit determination that is included in the response body, it is determined that the cookie does not exist.

As described above, on the basis of the execution result of the program code for a cache hit determination, it is possible to determine whether the response of the web page is generated by the server device or returned from the cache. On the basis of the determination result, a function of updating all or a portion of the contents of the web page or the identifier of the web page is added to the program code. In this way, at the time of the cache hit, the identifier of the web page is updated or the contents of the web page are updated.

According to another aspect, a function of recording the determination result and the identifier in the local disk of the client device is added to the program code so as to determine the cache hit. In this case, when a cookie including an identifier does not exist, that is, the cache hit is made, a function of searching the determination result and the identifier that are recorded in the local disk of the client device and determining whether the same identifier as the identifier included in the response body of the web page is included is added, thereby determining whether the corresponding response is the response returned from the cache provided in the client device or the response returned from the cache provided between the client device and the server device. This is because the identifier included in the response body is recorded in the local disk by the program code when the response is the response received by the client device, and the corresponding identifier is not recorded when the response is not received by the client device. When the same identifier as the identifier that is included in the response body of the web page is included in the records in the local disk, it is determined that the response is the response returned from the cache of the client device. When the same identifier does not exist, it is determined that the response is the response returned from the cache provided between the client device and the server device.

Further, when the program code or a setting instruction of the cookie is inserted into the program code with respect to the response, a modification is not applied to the web application of the server device, and the program code or the setting instruction is inserted into the response after the response of the web application is generated. The insertion may be made in the proxy server device that is provided between the server device and the client device as well as the server device. In addition, the execution of the program or the cookie setting in the client device can be realized by the web browser that has the above functions. The tool does not need to be installed in the client device.

According to another aspect of the present invention, the configuration according to one aspect of the present invention is provided. However, an apparatus that has the above configuration may be disposed in the server device or between the server device and the client device.

That is, according to the first embodiment and the first to eighth modifications, a first computer can determine whether a response is a response returned from a cache in the first computer, a response returned from a cache provided between the first computer and a second computer, or a response generated by the second computer.

Further, according to the first embodiment and the first to eighth modifications, the first computer performs a cache hit determination, thereby managing cache utilization of an application that is executed by the second computer.

Furthermore, according to the first embodiment and the first to eight modifications, since a unique identifier is generated whenever a request of a web page is transmitted from the first computer to the second computer, records of the processes of the web page can be divisionally executed for each request, and a system operation management can be easily performed.

What is claimed is:

1. An application execution status managing method that manages an execution status of an application provided in a computer system that includes a first computer, a second computer connected to the first computer through a network, and a cache management device connected to the first computer and the second computer, the application execution status managing method comprising:

receiving, by the cache management device, a request relating to the application from the second computer;

judging, by the cache management device, whether a response corresponding to the request is stored in a cache data area of the cache management device;

if the response is stored in the cache data area, sending, by the cache management device, the response to the second computer;

if the response is not stored in the cache data area, sending, by the cache management device, the request to the first computer;

upon receiving the request by the first computer, inserting, by the first computer, a unique identifier and a program code, which instructs the second computer to execute a first inspection to determine whether a cookie including the unique identifier as a cookie name exists in a cookie data area of the second computer when the second computer receives the response corresponding to the request and to delete the cookie having the unique identifier as the cookie name after the first inspection, into a web page that is included in the response corresponding to the request received from the cache management device;

inserting, by the first computer, an instruction, which sets the cookie having the unique identifier as the cookie name in the second computer, into a header of the response corresponding to the request received from the cache management device;

sending, by the first computer, the web page and the response including the header to the second computer via the cache management device; and storing, by the cache management device, the response received from the first computer, except for the instruction inserted into the header, in the cache data area, wherein the response sent to the second computer enables the second computer to execute the instruction inserted into the header of the response before the program code.

2. The application execution status managing method according to claim 1,
wherein the program code instructs a first inspection result to be recorded in a local disk of the second computer.

3. The application execution status managing method according to claim 1,
wherein the program code instructs a first inspection result to be transmitted from the second computer to the first computer.

4. The application execution status managing method according to claim 1,
wherein the program code instructs the second computer to regenerate a unique identifier in the web page when it is determined that the cookie does not exist according to the first inspection result.

5. The application execution status managing method according to claim 2, further comprising:
receiving, by the first computer, a request relating to the application from the second computer; and
returning, by the first computer, the web page, and reading out, by the second computer, the first inspection result recorded in the local disk of the second computer with respect to the request from the second computer and displaying a ratio of the number of times a specific unique identifier has matched a cookie name at the second computer to the number of times which it has not matched.

6. The application execution status managing method according to claim 3, further comprising:
recording, by the first computer, the first inspection result transmitted from the second computer, wherein the web page displays a ratio of the number of times a specific unique identifier has matched a cookie name at the second computer to the number of times which it has not matched.

7. The application execution status managing method according to claim 1,
wherein the program code instructs the second computer to transmit to the first computer a request to read out at least a portion of the web page again from the first computer, when it is determined that the cookie does not exist according to the first inspection result.

8. The application execution status managing method according to claim 2,
wherein the program code instructs the second computer to execute a second inspection to determine whether a result matched with the unique identifier is recorded in the first inspection result recorded in the local disk of the second computer and to record the first inspection result, the second inspection result, and the unique identifier in the local disk of the second computer.

9. The application execution status managing method according to claim 1,
wherein the program code instructs the second computer to set a flag, to delete a cookie including an identifier of another web page as a cookie name after a predetermined time passes.

10. A cache hit determining method in a computer system that includes a first computer, a second computer, a cache management device and a network used to connect the first computer, the second computer and the cache management device, the cache hit determining method comprising:
receiving, by the cache management device, a request relating to an application from the second computer;

judging, by the cache management device, whether a response corresponding to the request is stored in a cache data area of the cache management device;

if the response is stored in the cache data area, sending, by the cache management device, the response to the second computer;

if the response is not stored in the cache data area, sending, by the cache management device, the request to the first computer;

upon receiving the request by the first computer, inserting, by the first computer, in the response to the request, unique identifier and a program code, which instructs the second computer to execute a first inspection to determine whether cookie data including the unique identifier as a cookie name exists in a cookie data area of the second computer when the second computer receives the response corresponding to the request and delete a cookie having the cookie name after the first inspection, into a web page that is included in the response corresponding to the request received from the cache management device;

inserting, by the first computer, an instruction, for the second computer to set the unique identifier as the cookie name of the response in the second computer, in a header of the response corresponding to the request received from the cache management device;

returning the response corresponding to the request received from the cache management device to the second computer via the cache management device; and storing, by the cache management device, the response received from the first computer, except for the instruction inserted into the header, in the cache data area, wherein the response sent to the second computer enables the second computer to execute the instruction inserted into the header of the response before the program code.

11. A non-transitory computer readable medium containing instructions for performing a method of operating a repeater, where the repeater is connected to a first computer and a second computer, the method comprising:

receiving, by the repeater, a request relating to an application from the second computer;

judging, by the repeater, whether a response corresponding to the request is stored in a data area of the repeater;

if the response is stored in the data area, sending, by the repeater, the response to the second computer;

if the response is not stored in the data area, sending, by the repeater, the request to the first computer;

upon receiving the request by the first computer, inserting, by the first computer, a unique identifier of a web page included in a body of the response corresponding to the request from the second computer and a program code, which instructs the second computer to execute a first inspection to determine whether a cookie including the unique identifier as a cookie name exists in a cookie data area of the second computer when the second computer receives the response corresponding to the request and to delete the cookie after the first inspection, in the web page of the response corresponding to the request received from the repeater;

inserting an instruction, by the first computer, that sets a cookie using the unique identifier as a cookie name in the second computer, into a header of the response corresponding to the request received from the repeater;

transmitting, by the first computer, the response corresponding to the request received from the repeater to the second computer via the repeater; and storing, by the repeater, the response received from the first computer, except for the instruction inserted into the header, in the data area, wherein the response sent to the second computer enables the second computer to execute the instruction inserted into the header of the response before the program code.

12. A non-transitory computer readable medium containing instructions for performing a method of operating a server computer that is connected to a client computer through a network, where a cache management device is connected to the server computer and the client computer through the network, the method comprising:

receiving, by the cache management device, a request from the client computer for an application executed by the server computer;

judging, by the cache management device, whether a response corresponding to the request is stored in a cache data area of the cache management device;

if the response is stored in the cache data area, sending, by the cache management device, the response to the client computer;

if the response is not stored in the cache data area, sending, by the cache management device, the request to the server computer;

upon receiving the request by the server computer, inserting, by the server computer, a unique identifier for each response with respect to the request and a program code, which instructs the client computer to execute a first inspection to determine whether a cookie including the unique identifier as a cookie name exists in a cookie data area of the client computer when the client computer receives each response corresponding to the request and to delete the cookie after the first inspection, into a web page included in the response corresponding to the request received from the cache management device;

inserting an instruction, by the server computer, which sets the unique identifier as an attribute value of the response in the client computer, into a header of the response corresponding to the request received from the cache management device;

transmitting the response to the client computer via the cache management device; and storing, by the cache management device, the response received from the server computer, except for the instruction inserted into the header, in the cache data area, wherein the response sent to the client computer enables the client computer to execute the instruction inserted into the header of the response before the program code.

13. The application execution status managing method according to claim 1, wherein the second computer determines that the response, received from the cache management device, is a response stored in the cache data area, if the cookie, that uses the unique identifier as the cookie name, does not exist in the first inspection.

* * * * *